(12) United States Patent
Esswie

(10) Patent No.: US 12,219,455 B2
(45) Date of Patent: Feb. 4, 2025

(54) ADAPTIVE SIDELINK DATA SPLIT AND DUPLICATION

(71) Applicant: Dell Products, L.P., Round Rock, TX (US)

(72) Inventor: Ali Esswie, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 376 days.

(21) Appl. No.: 17/892,092

(22) Filed: Aug. 21, 2022

(65) Prior Publication Data
US 2024/0064603 A1    Feb. 22, 2024

(51) Int. Cl.
| H04B 7/00 | (2006.01) |
| H04W 40/04 | (2009.01) |
| H04W 40/16 | (2009.01) |
| H04W 92/18 | (2009.01) |

(52) U.S. Cl.
CPC ........... H04W 40/04 (2013.01); H04W 40/16 (2013.01); *H04W 92/18* (2013.01)

(58) Field of Classification Search
CPC ...... H04W 40/04; H04W 40/16; H04W 92/18
USPC ....................................................... 370/310
See application file for complete search history.

(56) References Cited

U.S. PATENT DOCUMENTS

| 10,425,779 | B2 * | 9/2019 | Li | H04W 52/325 |
| 11,671,940 | B2 * | 6/2023 | Ryu | H04W 16/28 |
| | | | | 370/329 |
| 11,937,213 | B2 * | 3/2024 | Akkarakaran | H04L 5/0053 |
| 11,968,736 | B2 * | 4/2024 | Dutta | H04W 52/0216 |
| 2021/0067997 | A1 * | 3/2021 | Wang | H04W 24/10 |
| 2021/0160828 | A1 * | 5/2021 | Taherzadeh Boroujeni | |
| | | | | H04W 64/003 |
| 2022/0232474 | A1 * | 7/2022 | Xu | H04W 52/0245 |
| 2024/0057032 | A1 * | 2/2024 | Esswie | H04W 68/02 |
| 2024/0057068 | A1 * | 2/2024 | Esswie | H04W 72/20 |

OTHER PUBLICATIONS

Technical specifications (TS) 38.201—"5G; NR; Physical layer; General description", 3GPP TS 38.201 version 15.0.0 Release 15, Sep. 2018, 14 pages.
Technical specifications (TS) 38.331—"5G; NR; Radio Resource Control (RRC); Protocol specification", 3GPP TS 38.331 version 16.1.0 Release 16, Jul. 2020, 886 pages.

(Continued)

*Primary Examiner* — Amancio Gonzalez
(74) *Attorney, Agent, or Firm* — Amin, Turocy & Watson, LLP

(57) ABSTRACT

A sidelink user equipment with traffic to transmit towards a destination user equipment determines a plan of multiple paths for delivering the traffic. Each path may comprise multiple user equipment and may carry different portions of the traffic or a duplicate of traffic that another path is carrying. A traffic delivery plan may be based on resource availability information received from the user equipment of the paths in response to a request for the resource availability information. A traffic delivery plan may comprise a ratio of splitting the traffic among the paths. A traffic delivery plan may be adapted to changing conditions, such as congestion, experienced by a user equipment of a path. Indication of a changed condition may be provided according to a configured periodicity or based on a configured criterion being met.

20 Claims, 13 Drawing Sheets

(56) References Cited

OTHER PUBLICATIONS

Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
Technical report (TR) TR 37.985—"LTE; 5G; Overall description of Radio Access Network (RAN) aspects for Vehicle-to-everything (V2X) based on LTE and NR" 3GPP TR 37.985 version 16.0.0 Release 16, Jul. 2020, 37 pages.

* cited by examiner

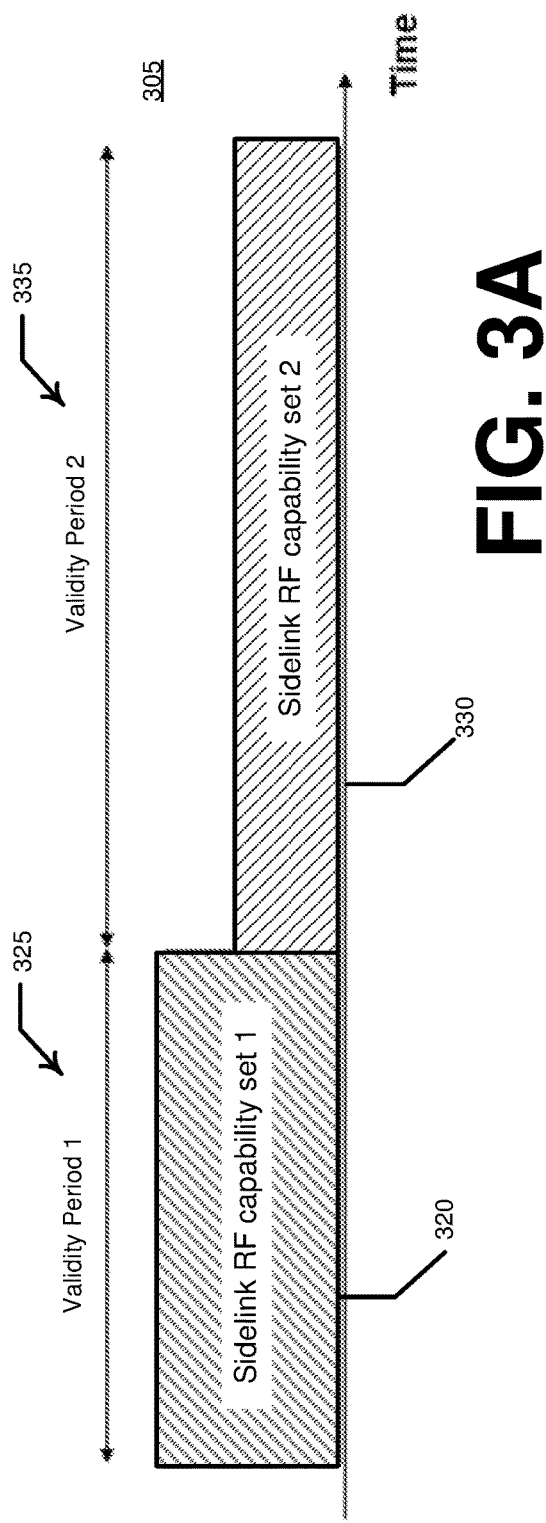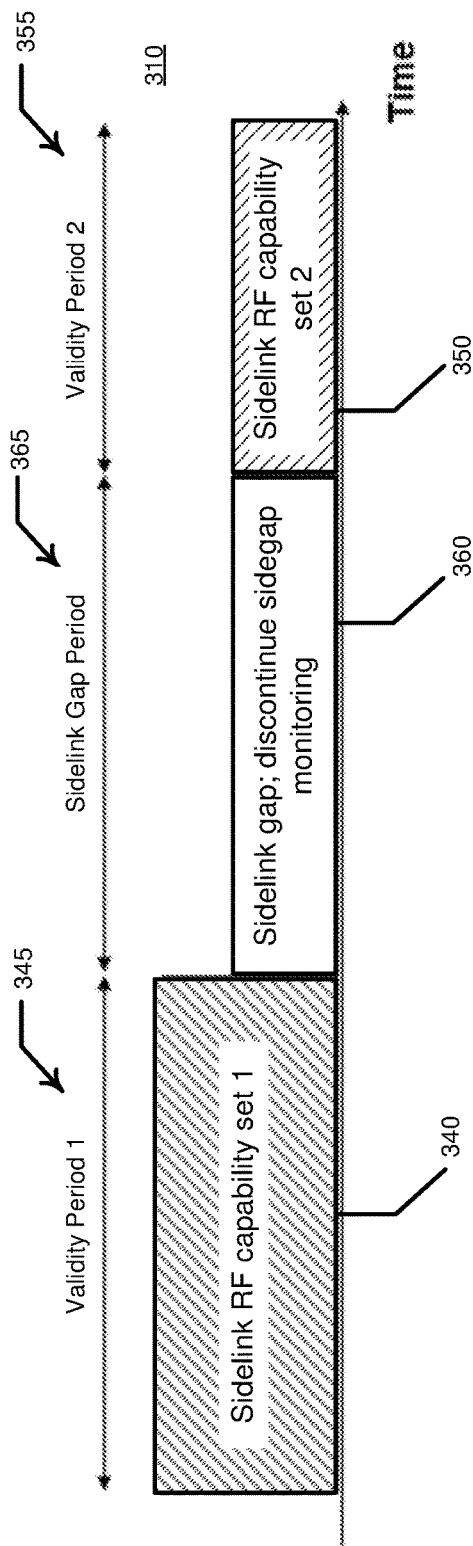

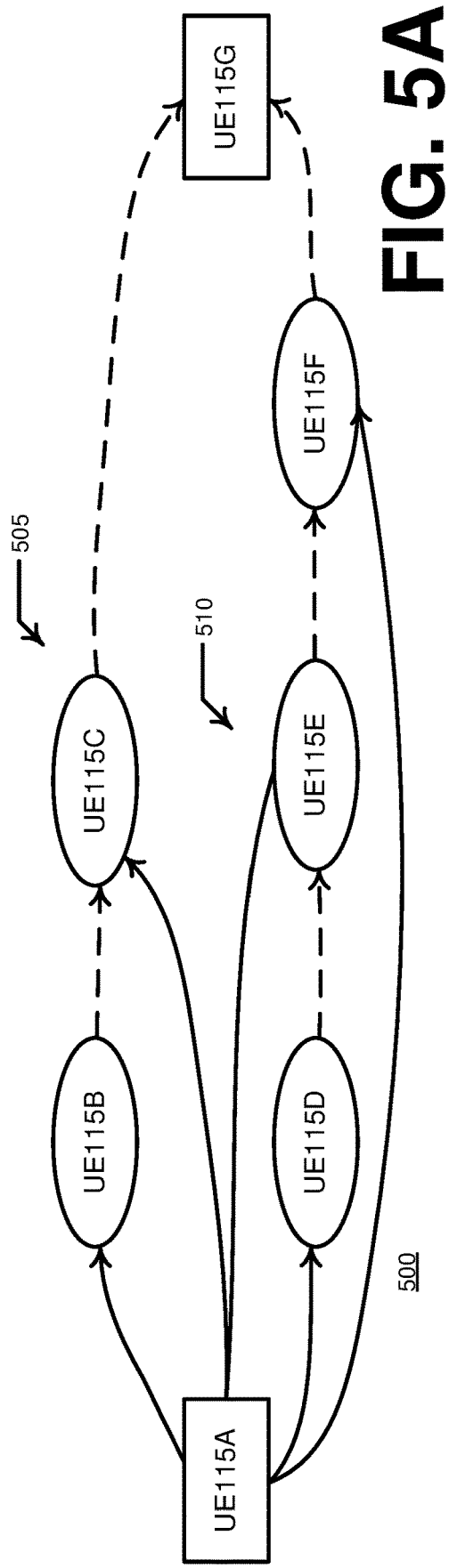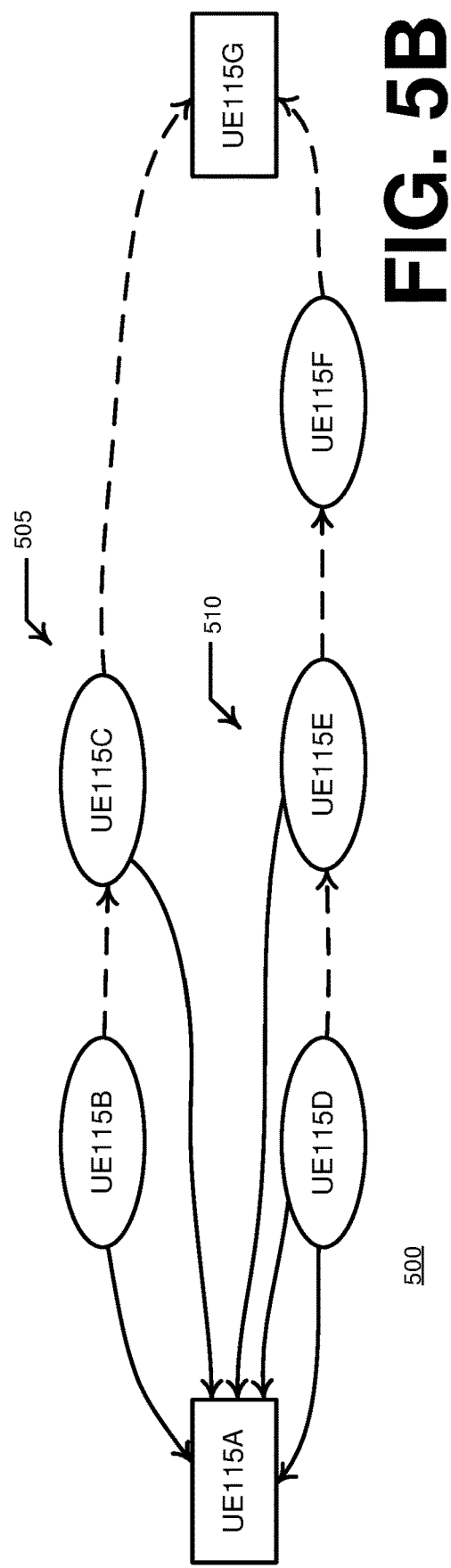

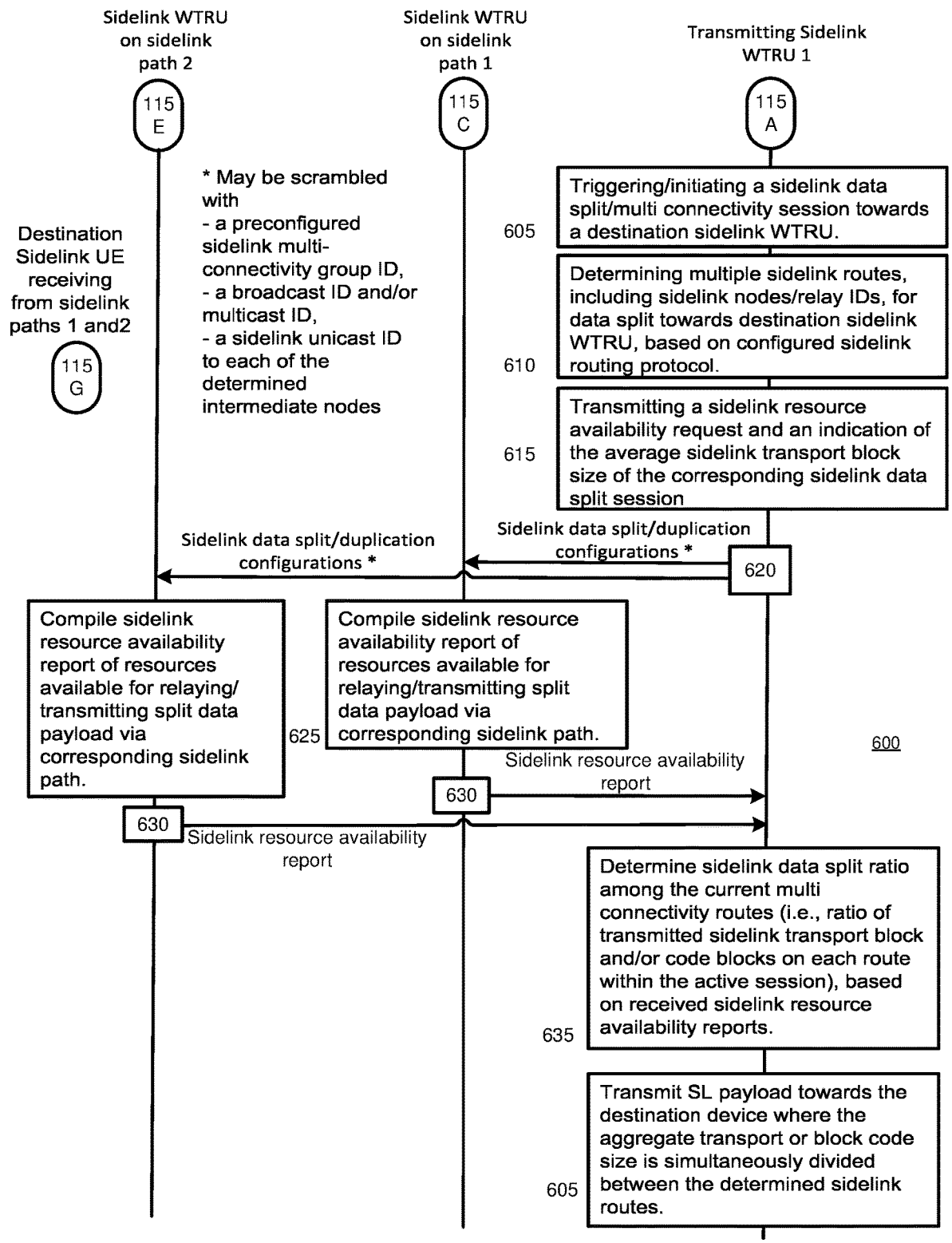

FIG. 13

Resource availability set 1:
Timing and frequency resources (i.e., resource pattern, and/or resource starting sidelink slot/symbol, DFN and length in time and sidelink frequency subchannels and/or PRBs)

Resource availability set N:
Timing and frequency resources (i.e., resource pattern, and/or resource starting sidelink slot/symbol, DFN and length in time and sidelink frequency subchannels and/or PRBs)

Sidelink quality indicator (s-CQI) and/or signal to interference ratio (SINR) to next hop towards destination device

Channel busy ratio (CBR)

1305

Earliest possible payload scheduling time, including the starting sidelink direct frame number, sidelink slot and/or sidelink symbol and/or sidelink resource pool index.

Estimated scheduling duration, in terms of either a quantized time indication and/or explicitly in ms, slots, symbols, sidelink transmission time intervals.

1310

ADAPTIVE SIDELINK DATA SPLIT AND DUPLICATION

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Sidelink communications may facilitate a variety of cellular use-cases such as autonomous vehicle crash avoidance, public avoidance, coordinated vehicle cruise control, and the like, where devices become able to communicate and coordinate directly with each other without communication messaging and signaling going through the RAN network. This is particularly important in cases where some of or all user equipment that coordinate as part of a sidelink group are located beyond RAN wireless coverage. In scenarios where user equipment are beyond RAN coverage, the RAN nodes may control how sidelink resources are dynamically reserved and released for each device to prevent more than one user equipment of a sidelink group transmitting simultaneously on partially or fully overlapping sidelink resource to avoid transmission collision.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises receiving, by a first user equipment of a wireless sidelink communication zone group in a long-range wireless communication network, a portion of a data traffic flow directed to a second user equipment of the wireless sidelink communication zone group; determining, by the first user equipment, a first sidelink path from the first user equipment to the second user equipment and a second sidelink path from the first user equipment to the second user equipment according to a sidelink data transmission protocol, wherein the first sidelink path comprises a third user equipment of the wireless sidelink communication zone group and the second sidelink path comprises a fourth user equipment of the wireless sidelink communication zone group; transmitting a first sidelink path configuration corresponding to the first sidelink path to the third user equipment and a second sidelink path configuration corresponding to the second sidelink path to the fourth user equipment; receiving, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment; determining, based on the first characteristic value and the second characteristic value, a determined traffic delivery plan to deliver the portion of the data traffic flow from the first user equipment to the second user equipment via the first sidelink path and the second sidelink path, respectively; and transmitting the portion of the data traffic flow to the second user equipment via the first sidelink path and the second sidelink path according to the determined traffic delivery plan. The first and second characteristic values, and indications thereof, may be determined by the third and the fourth user equipment, respectively, and may indicate, or correspond to, an availability of an RF resource.

The first characteristic value or the second characteristic value may comprise information, respectively corresponding to the third user equipment or the fourth user equipment, related to at least one of: a first number of active transmitting radio frequency (RF) chains, respectively, of the third user equipment or fourth user equipment, a second number of active receiving RF chains, respectively, of the third user equipment or fourth user equipment, a validity period of time, an index of a default RF capability set, or a sidelink resource unavailable period.

The first characteristic value or the second characteristic value may comprise information, respectively corresponding to the third user equipment or the fourth user equipment, related to at least one of: an available resource timing pattern and spectrum allocation, a sidelink channel quality indicator parameter, a signal to interference noise ratio associated with communication to a next user equipment in the first sidelink path or the second sidelink path after the third user equipment or the fourth use equipment, respectively, a channel busy ratio parameter, an earliest possible timing instant, a sidelink direct frame number, a sidelink symbol, or a sidelink slot.

The example embodiment method may further comprise transmitting a first characteristic report request requesting first indications from multiple user equipment of the wireless sidelink communication zone group, wherein the first indication or the second indication is received in response to the transmitting of the first characteristic report request. Thus, members of the sidelink group provide resource availability information regarding resource set availability in resource availability reports to the user equipment with traffic to deliver to a destination user equipment, which may use the resource information to determine multiple paths comprising different sidelink devices to facilitate delivery of the traffic.

The example embodiment method may further comprise transmitting a second characteristic report request requesting second indications from the multiple user equipment of the wireless sidelink communication zone group, wherein a third indication or a fourth indication is received in response to the transmitting of the second characteristic report request, and wherein at least one of the third indication or the fourth indication indicates a change of the first characteristic value or the second characteristic value to an updated first characteristic value or an updated second characteristic value, respectively; determining, based on the updated first characteristic value or the updated second characteristic value, a determined updated traffic delivery plan to deliver the portion of the data traffic flow from the first user equipment to the second user equipment via the first sidelink path and the second sidelink path, respectively; and transmitting the portion of the data traffic flow to the second user equipment via the first sidelink path and the second sidelink path according to the determined updated traffic delivery plan, wherein the determined traffic delivery plan comprises first instructions to transmit a first subportion of the data traffic flow to the second user equipment via the first sidelink path and a second subportion of the data traffic flow to the second user equipment via the second sidelink path, wherein the determined updated traffic delivery plan comprises second instructions to transmit a third subportion of the data traffic flow to the second user equipment via the first sidelink path and a fourth subportion of the data traffic flow to the second user equipment via the second sidelink path, and wherein a first subportion ratio of the first subportion to the second subportion is different than a second subportion ratio of the third subportion to the fourth subportion.

In an embodiment, the transmitting of the portion of the data traffic flow according to the determined traffic delivery plan may comprise transmitting a first subportion of the portion of the data traffic flow to the second user equipment via the first sidelink path and a second subportion of the portion of the data traffic flow via the second sidelink path, wherein one of the first subportion or the second subportion comprises a duplicate of the second subportion or the first subportion, respectively, wherein the determining of the determined data traffic delivery plan is based on the first characteristic and the second characteristic corresponding to a first congestion of the first sidelink path and a second congestion of the second sidelink path, respectively, and wherein the first congestion and the second congestion are lower than a configured congestion threshold. The configuration of the congestion threshold may be received from a RAN node or may be determined based on a traffic type of the traffic to be delivered to the destination user equipment.

In an embodiment, the transmitting of the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein the first subportion comprises all of the portion of the data traffic flow and the second subportion comprises less than all of the portion of the data traffic flow, wherein the determining of the determined data traffic delivery plan is based on the first characteristic and the second characteristic corresponding to a first congestion of the first sidelink path and a second congestion of the second sidelink path, respectively, wherein the first congestion is lower than a configured congestion threshold, and wherein the second congestion is higher than the configured congestion threshold. In this embodiment, the example method may further comprise determining, according to a defined importance criterion, important packets of the portion of the data traffic flow that have an importance higher than a configured importance threshold, and wherein the second subportion of the portion of the data traffic flow comprises only the important packets. The importance threshold may be configured from information received from a RAN node or more be determined based on a type of traffic corresponding to the traffic to be delivered to the destination user equipment.

In an embodiment, the user equipment with traffic to deliver to a destination user equipment, for example, the first and second user equipment, respectively, may determine, according to a defined importance metric, important packets of the portion of the data traffic flow that have an importance higher than a configured importance threshold, and wherein the second subportion of the portion of the data traffic flow comprises only the important packets.

In an embodiment, at least one user equipment of members of the wireless sidelink communication zone group moves with a vehicle and is configured to perform vehicle telematics operations, comprising at least one of: vehicle-to-vehicle communications or vehicle-to-infrastructure communications. Multiple user equipment may correspond to multiple vehicles, which user equipment may be referred to as 'vehicle-centric' user equipment, operating on a roadway and may be operating as parts of the sidelink communication zone group to exchange information corresponding to such as parameters as vehicle location, vehicle braking, vehicle steering, vehicle acceleration, and the like, to be used by the vehicles in performing autonomous driving operations on the roadway. At least one of the user equipment members of the wireless sidelink communication zone group may comprise a stationary device along a roadway (may be referred to as a roadside user equipment) that is configured to perform vehicle-to-infrastructure communications. The roadside UE may perform calculations based on data transmitted from one or more 'vehicle-centric' devices that do not have as much computing power, or access to as much computing resource power as the roadside user equipment. The roadside UE may transmit calculated data or values back to the vehicle-centric user equipment of the sidelink group to be used for autonomous driving, or other activities. Due to the safety-related nature of autonomous driving, some traffic flows related to autonomous driving may be deemed as important traffic (e.g., exceeds an importance threshold), and a sidelink device, such as the first user equipment, may prioritize traffic flow related to vehicle operations for low latency and high reliability. It will be appreciated that other types of traffic may also be deemed as important, such as, for example, traffic related to a virtual reality session or traffic related to a medical operation or consultation.

BRIEF DESCRIPTION OF THE DRAWINGS

FIGS. 3A and 3B illustrate multi-sidelink path example embodiments.

FIG. 5A illustrates a multipath sidelink group request for RF capability set information example embodiment.

FIG. 5B illustrates a multipath sidelink group response to a request for RF capability set information example embodiment.

FIG. 6 illustrates a timing diagram of an example method to provide multipath sidelink group RF capability set information to a member of a sidelink group.

FIG. 13 illustrates charts showing example sidelink resource set information embodiments.

DETAILED DESCRIPTION OF THE DRAWINGS

Figure 1:
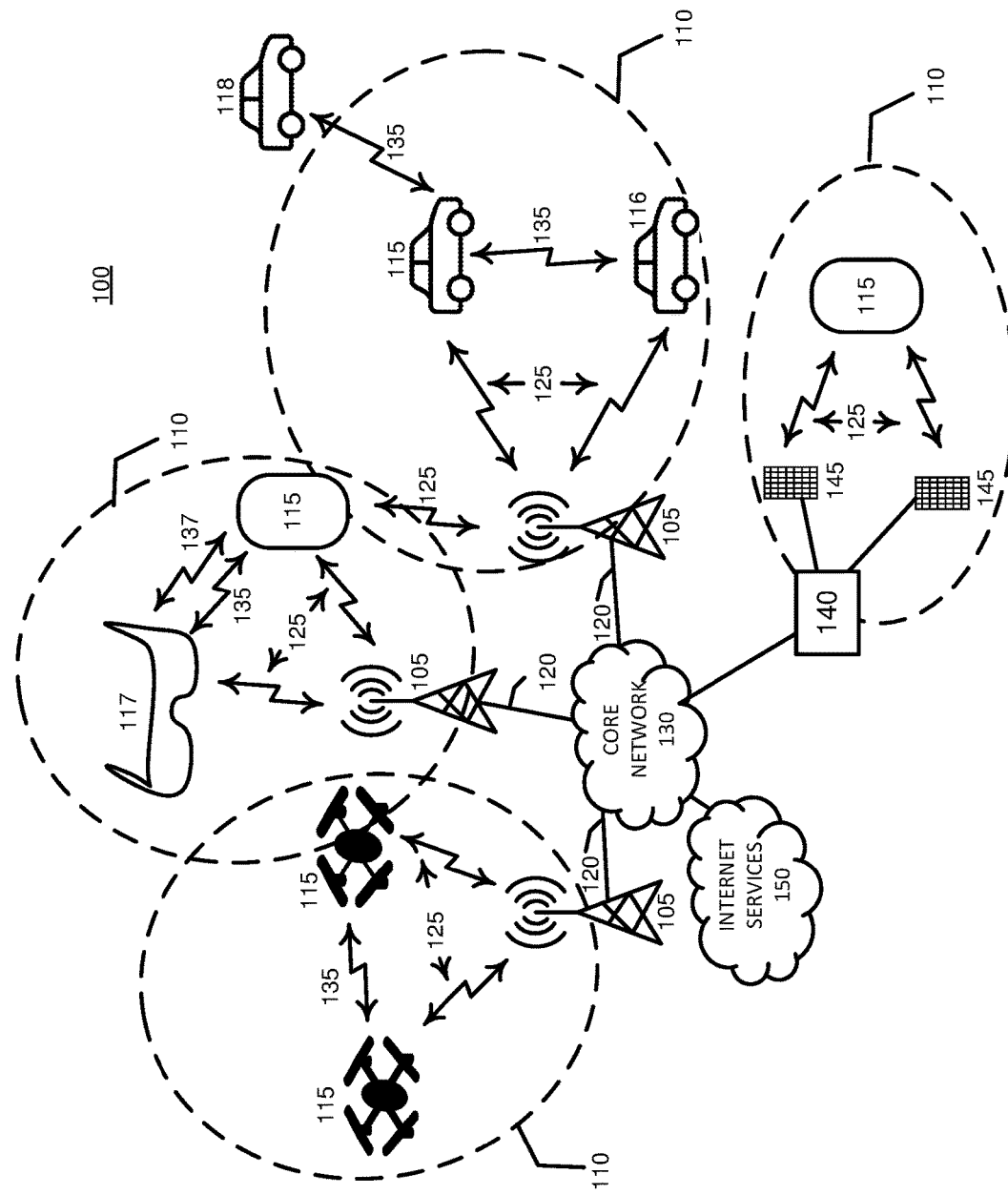
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Sidelink communications refers to cellular devices communicating with each other directly, without having to go through a serving RAN node, by establishing a sidelink communication link. However, a RAN node may or may not control how sidelink resources are being reserved and dictated by different sidelink devices. In one sidelink radio resource management option, sidelink devices are configured to always request a sidelink resource towards another sidelink device from the serving RAN node. This requires that at least, the transmitting sidelink node to be within the coverage of the serving node. Furthermore, the sidelink-experienced communication latency clearly increases due to the additional transmission of the RAN scheduling request and reception of the corresponding scheduling grant before the sidelink scheduling and transmission are triggered. Advantageously, this reduces the possibility of sidelink channel collisions.

In another radio resource management option, sidelink devices are configured to autonomously sense the sidelink channel resources, determine which sidelink resource are reserved for other devices' sidelink transmissions, and determine which resource set is free/available for their own transmission. The channel sensing rules and high-level channel sensing configurations are indicated from the RAN network. Therefore, the sidelink control channel has been designed to support efficient channel sensing over the sidelink interface. In particular, the sidelink control channel is designed in a two-stage format. The first stage carries a first stage sidelink control information ("SCI") and the second stage carries a second stage SCI.

The first stage SCI is similar to the RAN downlink control information ("DCI") and may carry the following information elements: scheduling information of a reserved data resource for a sidelink transmission of interest, and scheduling resource information of the second stage SCI that carries the transmission-specific configuration of the sidelink data channels.

Accordingly, sidelink devices attempt blindly decoding of the first stage SCI to determine which sidelink data resource will be reserved by which sidelink device in proximity. However, the sensing sidelink device cannot determine whether an actual sidelink data payload is destined for it, thus a sidelink device decodes the second stage SCI. The second stage SCI carries the following information elements: source device and destination device identifiers of the sidelink transmission, and sidelink transmission configurations including modulation schemes, coding schemes, and HARQ feedback information.

Therefore, a sidelink device monitors and blindly decodes the first stage SCI to determine the reserved channel resources for the associated sidelink transmission, determines transmission configurations of the second stage SCI, and decodes the second stage SCI to determine if a corresponding sidelink transmission is destined for it. If a sidelink device is a transmit-only device (e.g., an M2M device), the device need only receive and blindly decode the first stage SCI, while skipping decoding of the second stage SCI, in which case channel sensing may only comprise monitoring, detection, and blind decoding of the first stage SCI.

There are two modes of channel sensing. First, continuous channel sensing may be configured such that a control channel of the sidelink interface signaling can flexibly be placed at any time instant such that a sensing sidelink device needs to always search and monitor for a control channel that is carrying the first stage SCI. Second, and due to the significant power consumption burden of the continuous sensing, a partial channel sensing procedure may be implemented, such that the sidelink control channel is configured to be periodically, or non-periodically, transmitted during predefined time instants, or occasions, and accordingly, sensing sidelink device need only monitor and blindly decode those timing and frequency instants while possibly deep sleeping otherwise.

Sidelink relays are sidelink devices that are performing sidelink and RAN functions on behalf of, or for the sake of, other remote sidelink devices in proximity to the sidelink relay. Sidelink relays offers a wide set of sidelink functions for remote sidelink devices including channel granting, multi-hop traffic relaying, or paging monitoring. Thus, less capable sidelink remote devices obtain several performance advantages such as power saving gains, and sidelink and RAN network coverage extension. Accordingly, there are two modes which a sidelink relay device may adopt for announcing their presence for remote devices in proximity. In one variant, sidelink relays explicitly announce their presence using a preconfigured discovery procedure. During the configured discovery period, sidelink relay broadcasts an announcement message that indicates their presence and their associated relaying configurations. Remote devices receive a relay's discovery messages and, upon interest in becoming part of, or a member of, a sidelink zone, or group, that includes the relay, initiate a direct communication link with the sidelink relay.

In another discovery variant, a sidelink remote device proactively transmits a discovery message requesting that sidelink relays in proximity announce their presence and corresponding relaying services. This option offers the advantage of the on-demand discovery signaling where sidelink relays avoid transmitting unnecessary discovery messages that may not be utilized by present remote devices in proximity.

Layer-2 relaying denotes that the end-to-end protocol stack and QoS targets over sidelink interface will not be interrupted at the relay, e.g., the relay alters lower layer headers to perform traffic relaying. Thus, with layer-2 relays, the end-to-end QoS and flows can be tracked and maintained. However, for layer-3 relaying, the end-to-end QoS is lost at the relay side because the latter alters and translates the original QoS flows metrics to corresponding relay-specific metrics.

Sidelink discontinuous reception ("DRX") cycle and channel partial sensing partially address the issue of device battery consumption. A sidelink device is configured with a DRX cycle that consists of a period of monitoring control channels to determine if there is a scheduled sidelink reception, and a period of deep sleeping such that power consumption of the sidelink device is optimized. Unlike RAN DRX procedures, sidelink inter-device coordination procedures must be in place for sidelink DRX, due to the distributed nature of the sidelink interface. For example, a sidelink device my transmit a sidelink scheduling information towards another sidelink device in proximity that is currently deep sleeping, leading to the sleeping device missing the detection of the scheduling information, and accordingly, increasing the sidelink transmission latency. Thus, sidelink devices in proximity coordinate on DRX cycles that are common at least between device pairs of interest.

Regarding partial channel sensing, sidelink devices implementing continuous channel sensing need to always monitor sidelink control channels for potential scheduled transmissions, which results in significant battery power consumption due to the frequent blind decoding attempts. With partial channel sensing and sidelink DRX, the scheduling of the control channel is preconfigured during certain periodic occasions during which sidelink devices expect to perform channel sensing. Thus, partial channel sensing enables sidelink devices to deep sleep over extended periods of time, even during a sidelink DRX channel wake period.

However, due to the functionality that the sidelink relays perform, power consumption is exacerbated for sidelink relays compared to non-relay sidelink UEs. That is, a sidelink relay needs to perform RAN-like procedures as well as sidelink functions for the relay device itself and its connected remote sidelink devices, leading to significant battery consumption. A sidelink relay relays traffic and performs RAN/sidelink functions on behalf of the connected remote sidelink devices. A sidelink relay may monitor and decode RAN/sidelink paging on behalf of remote devices. The higher the number of remote devices that are connected to the relay as part of a sidelink group, or zone, the more the number of paging occasions the sidelink relay monitors, detects, and decodes, which consumes battery power of the sidelink relay at a high rate. In addition, a sidelink relay may perform sidelink routing and relaying of traffic towards not-in-RAN-coverage sidelink devices. A sidelink relay device may also perform continuous and/or partial channel sensing on behalf of connected in-coverage remote sidelink devices. Such upgraded, or additional, functionality of sidelink relay devices introduces a power consumption limitation at the device end. Thus, power saving optimization procedures are desirable to enhance battery charge/energy availability at battery powered sidelink relays.

Moreover, the nature of the sidelink interface may be distributed with various device capabilities. Hence, some sidelink devices may be able to sense the sidelink channel continuously or partially while others may be sensing-non-capable devices. As all types of sidelink devices are required to coexist within the same configured sidelink resources, existing channel allocation and prioritization procedures (e.g., sidelink channel preemption procedures), fail to guarantee low latency and reliable sidelink communications. For instance, when some of the existing sidelink devices are not capable of, are not configured for, or do not perform channel sensing, current preemption procedures do not allow higher priority sidelink devices to instantly take over occupied resources, by sending preemption indication, since some devices in proximity may not be performing channel sensing, and accordingly, may skip detecting such preemption indication, and thus may introduce channel collisions to critical sidelink transmissions.

Accordingly, it is desirable to optimize latency performance and reliability of the sidelink communications when channel sensing capable and channel-sensing-non-capable sidelink devices coexist with each other on the same sidelink spectrum. In such deployments, existing sidelink channel allocation and prioritization procedures do not guarantee fast and reliable sidelink transmissions due to the key assumption that sidelink devices in proximity must be able to sense the sidelink channel allocation messages fully or partially, which is not applicable in many sidelink deployments. Thus, solutions for improving sidelink channel reliability and latency in multi-device multi-capability sidelink deployments are desirable.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Sidelink communications among user equipment may enable a variety of cellular use-cases such as autonomous vehicle crash avoidance, public avoidance, coordinated vehicle cruise control, and more, where devices become able to communicate and coordinate directly with each other and without data traffic communicated among them being transported via RAN nodes or other RAN components. Such sidelink communication may be particularly beneficial where some of or all coordinating UE devices are out of the RAN coverage.

If UE devices, which may correspond to, or which may be associated with, multiple vehicles, are outside of a coverage of a RAN, RAN nodes may control how sidelink resources are dynamically reserved and released for each UE device so that multiple sidelink devices do not transmit simultaneously on partially or fully overlapping sidelink resource to avoid transmission collisions. However, sidelink devices out of RAN coverage perform continuous, or periodic, sidelink channel sensing before any sidelink transmission and monitor and blindly decode channel reservations from other sidelink devices in proximity. Accordingly, for transmissions, and based on channel sensing results, sidelink user equipment may select sufficient free, or available, resources (e.g., frequency spectrum resources, or time occasions, for receiving transmission of traffic) to transmit a portion of a data traffic flow, for example at least one traffic packet. Using either channel resource allocation procedure (e.g., either RAN-controlled or based on sidelink channel sensing), a desired sidelink data rate and reliability may not be controlled, or controllable, due to traffic collision persistence or varying sidelink channel conditions over paths comprising hops across multiple nodes to reach a destination, or target, user equipment device. To support reliability and data-rate-critical services over a sidelink interface, including virtual reality sidelink applications or vehicle-to-vehicle scenarios, procedures for splitting of a traffic flow, or duplicating packets of a traffic flow, via a multi-path traffic delivery plan are desirable. Unlike existing dual connectivity procedures over RAN interfaces, and due to the distributed nature of a sidelink interface with multiple hops, novel adaptive procedures corresponding to multi-path multi-hop data splitting, for data rate enhancing, and data duplication, for reliability improvement, are desirable.

Dual connectivity in the context of user equipment connecting to RAN nodes refers to user equipment devices being simultaneously connected to multiple RAN nodes that transmit/direct different packets of, or portions of a traffic flow, or the same packets of, or portions of a traffic flow, directly to an intended destination/target device to enhance transmission reliability or transmission data rate of the traffic flow. However, existing data splitting or duplication that involves multiple RAN nodes may lead to sidelink congestion (e.g., congestion along a sidelink path comprising sidelink UE devices) or degraded sidelink reliability within sidelink devices that are joined together as part of a sidelink communication zone group due to collisions. For instance, a sidelink user equipment initiating a data splitting session towards a remote destination device, through multiple paths and which may each comprise multiple hops, or nodes (e.g., other user equipment devices of the sidelink group), may select a multi-path set where channel resource acquisition over any of intermediate nodes of a path (e.g., user equipment devices in a path between the initiating/transmitting user equipment and the destination/target user equipment) may not be guaranteed, due to, for example, dynamic channel sensing at a given node causing delayed availability of resources at the node. Such a scenario may result in one or more secondary sidelink traffic streams arriving at the destination/target sidelink device with a larger delay after a primary stream, resulting in a less efficient data split, and thus, a degraded sidelink data rate. Therefore, due to the potential multi-hop nature of a sidelink interface, as compared to the direct linking, or linking via a single hop, of a UE to a RAN node without intermediate devices between the UE and the RAN, data splitting or data duplication procedures are disclosed herein that facilitate adaptively or dynamically tuning, or adjusting, transmission of a traffic flow with respect to a data split ratio, activation, and deactivation based on real-time conditions (e.g., packet congestion) of hop-specific sidelink channels, or sidelink links to a sidelink UE of a sidelink group. With a RAN-to-UE link with no intervening nodes between the RAN and the UE, traffic splitting, or traffic duplication can be tuned only based on conditions of the single link. For sidelink deployments, where there are multiple hops of sidelink devices between transmitter and receiver, existing RAN-UE data splitting procedures do not adapt to varying hop-specific conditions of a sidelink link, which can result in a sidelink data rate reduction and wasted channel resources, by, for example, consuming/using more sidelink nodes to carry sidelink traffic or using more data channel resources for a data split without a concomitant increase in data rate because of channel resource blockage or large acquisition delays on one or more of the intermediate hops. Disclosed herein are several embodiments that facilitate efficient data split/dual connectivity over a sidelink interface, or interfaces, where a traffic split size, or traffic split ratio, and split configurations may be dynamically adapted to actual channel conditions (e.g., adapted substantially in real time as sidelink channel conditions are changing) of sidelink multi-hop paths that may carry traffic towards an intended destination sidelink device.

Figure 2A:
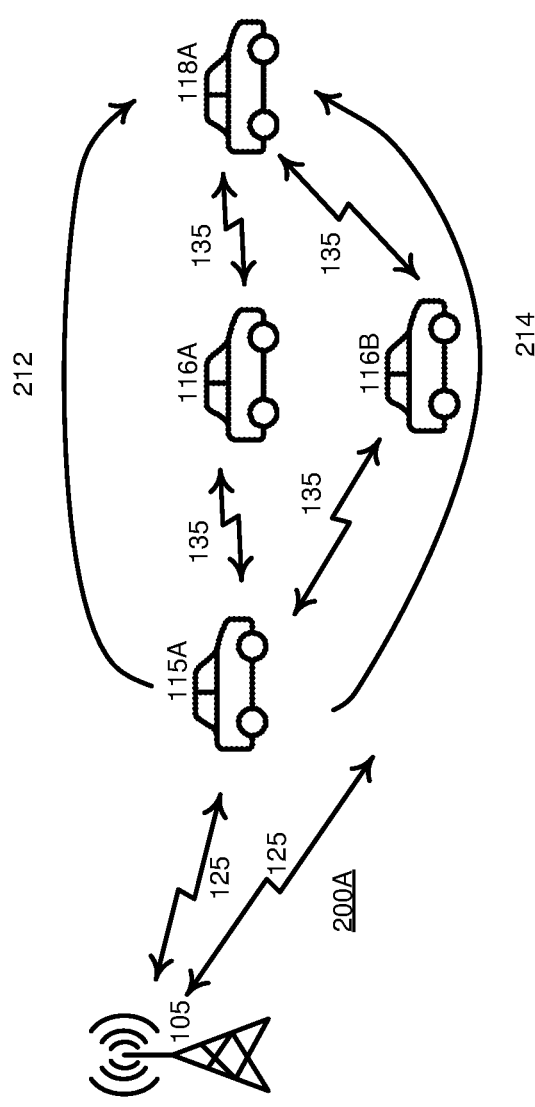
FIG. 2A illustrates an example vehicle-to-vehicle embodiment.

Turning now to FIG. 2A, the figure illustrates a vehicle-to-vehicle embodiment 200A. RAN node 105 communicates with UE 115 A via a long-range wireless link 125. UE115A communicates with UE116A via a side link communication link 135 and UE116A communicates with UE118A, also via a sidelink communication link, or channel, 135. Thus, UE115A, UE116A, and UE118A make up a first sidelink communication path 212. UE115A may communicate with UE116B via a side link communication link, or channel, 135 and UE116B may communicate with UE118A, also via a side link communication link, or channel. Accordingly, UE115A, UE116B, and UE118A, make up communication path 214. In reference to some embodiments described herein, UE 115A, UE 118A, UE 116A, and UE 116B may be referred to as a first user equipment, a second user equipment, a third user equipment, and a fourth user equipment, respectively and paths 212 and 214 may be referred to as a first sidelink path and a second sidelink path, respectively.

Figure 2B:
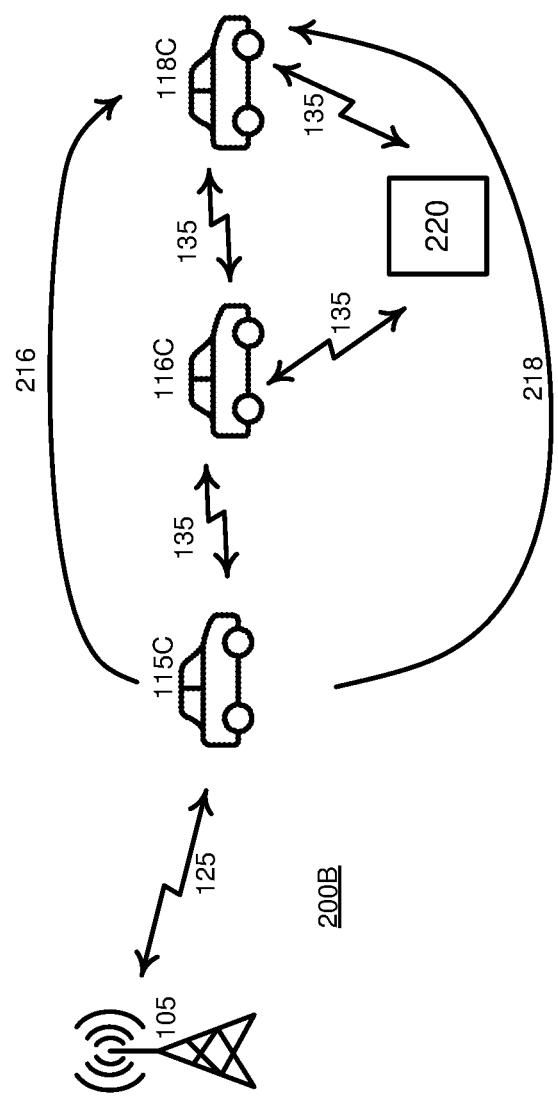
FIG. 2B illustrates an example vehicle-to-vehicle and vehicle-to-infrastructure embodiment.

Turning now to FIG. 2B, the figure illustrates a vehicle-to-infrastructure embodiment 200B. RAN node 105 may communicate with UE 115C via a long-range communication link 125. UE 115C may communicate with UE116C via a sidelink communication link 135, and UE116C may communicate with UE118C via a side link communication link, or channel 135. Thus, UE115C may communicate with UE116C, which may then communicate with 118C, to make up communication path 216. The figure also shows UE116C in wireless communication with a roadside infrastructure component, which is referred to as UE 220. UE116C may communicate with roadside infrastructure UE220 via a sidelink communication link, or channel, 135 and UE118C may also communicate with roadside infrastructure component 220 via a side link communication link, or channel. Accordingly, communication path 218 may facilitate communication between UE115C and UE118C via UE116C and roadside infrastructure UE220.

As discussed in reference to FIG. 1, UEs 115A, 115B, in FIG. 2A, and 115C in FIG. 2B, and UEs 116A and 116B in FIG. 2A and UE 116C in FIG. 2B may be within range of RAN 105 via communication links 125. However, sidelink channels may nevertheless be used to communicate between UEs 115 and UEs 116 even for traffic transmitted from from or transmitted to RAN 105. Also as described in reference to FIG. 1, UEs 118A, 118 B, and 118C, may be outside, or beyond, a range, or reach, of a long-range wireless communication link 125 of RAN 105 and may use sidelink channels/links 135 from EUs 116A, 116B, or 116C, respectively, to facilitate wireless communication with the RAN node.

In some embodiments described herein, UE 115C, UE 118C, UE 116C, and roadside component UE 220 shown in FIG. 2B may be referred to as a first user equipment, a second user equipment, a third user equipment, and a fourth user equipment, respectively, and paths 216 and 218 may be referred to as a first sidelink path and a second sidelink path, respectively.

It will be appreciated that in FIG. 2A and FIG. 2B, mobile vehicles are given as examples of use cases where embodiments described herein may be useful, but are not meant to limit use cases of embodiments to only vehicles. For example, the user equipment shown in FIG. 2A and FIG. 2B may comprise stationary or mobile wireless communication devices such as smartphones, machine devices, virtual reality devices, or any other wireless communication device.

Dynamic Radio Frequency Radio Frequency Capability Adaptation.

Sidelink user equipment devices and sidelink user equipment devices operating as sidelink relays may perform radio interface operations simultaneously for RAN interfaces and for sidelink interfaces using different radio frequency ("RF") chains (e.g., RF circuitry). For example, a sidelink device may be receiving sidelink device traffic from a neighbor device using an RF chain while connecting to the RAN base station using a different RF chain for a separate communication session. By enhancing sidelink transmission capacity of user equipment with multiple RF chains such that sidelink UE devices may receive and/or transmit multiple traffic streams or duplicates at the same time, the per-device RF capability may increase correspondingly with the number of RF chains of a given device. For example, a sidelink user equipment device may be able to simultaneously receive multiple sidelink streams if two or more RF chains of the user equipment are otherwise idle. However, at another time, the same sidelink user equipment device may only be utilizing one RF chain to receive a sidelink reception while using one or more other available RF chains for RAN connection or another simultaneous sidelink connection. Thus, it is desirable to facilitate dynamic adaptation of RF capability (e.g., ability to make changes in real time in use of one or more RF chains) such that sidelink devices can optimize use of data traffic flow-splitting or data traffic flow-duplication.

Accordingly, embodiments disclosed herein may facilitate sidelink devices in sharing or exchanging their respective sidelink RF capability information, including information regarding a number of active RF chains of a UE and timing limitations associated with the active RF chains. For example, for a timing period determined by a given sidelink UE device, the sidelink device may indicate to other sidelink devices in proximity that it will be of a limited, single RF chain capability. Thus, sidelink devices that may be transmitting multiple simultaneous sidelink traffic streams or duplicate streams towards such device can dynamically adapt their transmissions such that they adopt a single stream/flow transmission, or duplicate transmissions of the same stream/flow, during the indicated determined timing period, for example, based on a timer or a timing gap, that the destination device (of the stream/flow) will be of a limited RF capability.

Before the herein disclosure of embodiments and concepts, sidelink devices have been assumed to be always capable of performing RAN and sidelink operations simultaneously. In case of a conflict, or packet collision, resulting from attempting to perform simultaneous RF operations and having a limited RF device capability (e.g., not enough RF chains to perform the attempted operations simultaneously), a given UE determines which of the RAN or sidelink operations is to be performed while the other operation is skipped or discarded, leading to a sidelink latency or reliability degradation due to the need to retransmit discarded or skipped packets of a traffic flow.

Sidelink communications may be viewed as complementary to RAN communications between UE devices and RAN nodes. Therefore, devices, with active sidelink sessions, should, at least, monitor a RAN interface paging channel for determining if there is a portion of, or packets of, a RAN traffic flow destined to, or directed to, the UE. This requires that a UE device's RF capability be dynamically shared between a RAN interface and a sidelink interface. (Use of the terminology "RF capability" may imply reference to a number of RF chains available for reception or transmission of a side link UE.) Sidelink RF capability adaptation may be particularly useful when splitting of a sidelink data flow or duplication of a sidelink data flow via a separate data flow is adopted for transmitting, or directing, a given traffic to a destination, or target, sidelink device. Thus, a receiving sidelink device retains sufficient RF capability to be able to receive the multiple simultaneous transmitted streams. For example, a sidelink device needs two operational RF chains to simultaneously process and decode two different data streams.

Turning now to FIG. 3A, the figure illustrates RF capability information 305 of a sidelink user equipment, which may share the RF capability information with, or indicate the RF capability to, other sidelink user equipment, which may be members of a sidelink communication zone group of user equipment. The RF capability information may comprise a first sidelink RF capability set 320 and a second sidelink RF capability set 330. RF capability information may comprise characteristic values associated with characteristics of the user equipment, for example, a number of RF chains currently being used for receiving or transmitting traffic, a number of RF chains that are available for receiving or transmitting traffic, a spectrum part, or frequency, that can be used for the receiving or transporting, a validity period during which the RF chain(s) or spectrum is/are available. The RF capability information may comprise index values, or identifiers, that correspond to the first RF capability set, the second RF capability set, or a default RF capability set. The sidelink user equipment may also share a congestion, or a congestion value related to a congestion experienced by the user equipment that is sharing information corresponding to the congestion (the congestion may be past, present, or projected) that may be measured (or projected based on scheduled traffic, RF capability information received from other sidelink user equipment, or measured present congestion) with respect to transmitting or receiving by the sidelink user equipment.

Sidelink devices that receive capability set information indications from sidelink devices in proximity may determine expected RF capabilities of multiple other sidelink user equipment member devices in the sidelink group in case a data splitting session is to be established with any of the announcing sidelink devices (e.g., user equipment indicating or sharing their respective RF capability set information). For example, transmitting sidelink devices may determine to establish a data splitting session, or a data duplication session, with a destination sidelink device, during a validity period, indicated in an RF capability information indication, over which the destination sidelink device is able to simultaneously receive multiple sidelink data streams, and a transmitting sidelink device may switch to transmitting the same traffic flow, or stream, in a single stream transmission when the destination device becomes of a limited RF sidelink capability, which capability may have been indicated in an RF capability set, such as set 320 shown in FIG. 3A. Embodiment 305 may facilitate transmitting a traffic flow via sidelink transmissions without having to skip monitoring or decoding or discarding of packets at a receiving device due to a limited RF capability, which skipping or discarding could necessitate retransmitting the skipped or discarded packets thus degrading overall sidelink spectral efficiency (e.g., if skipping or discarding is avoided there is no need to retransmit the skipped or discarded packets thus not using spectrum and transmission occasions that could otherwise be used for transmitting other packets). In an embodiment, upon expiration of a validity period, such as validity period 325, of a certain RF capability set, it is assumed that a sidelink device revert to and use a lowest RF capability of indicated RF capability sets, or, if configured, perform sidelink receptions using a default RF capability. It will be appreciated that first capability set 320 is shown rising to a higher elevation in FIG. 3A than second capability set 330 to indicate more RF chains are available for use during the first RF capability set that the second RF capability set, or that more spectrum, or more channel frequencies, may be available for use during the first RF capability set than the second RF capability set.

FIG. 3B illustrates another resource sharing of RF capability information embodiment 310 that comprises a first RF capability set 340 during validity period 345, a second RF capability set 350 during validity period 355, and a sidelink discontinue gap 360 during sidelink discontinue gap period 365. In embodiment 310, sidelink devices share sidelink RF capability indications that comprise a period, or gap, 365 between the availability of resources corresponding to RF capability set indication 340 and the availability of resources corresponding to RF capability set indication 350. Discontinue gap 365 may correspond to a configured duration after an indicated sidelink RF capability set and may denote that a sidelink device that corresponds to RF capability information 310 may not be available for sidelink reception or transmission during the discontinue gap, or a discontinue period. Gap/period 365 can be defined, similarly to the validity period, in terms of a starting time, a duration of a timer, a number of sidelink slot(s), a number of symbols, or a number of direct frame numbers. During configured sidelink gap period 365, sidelink devices should halt ongoing sidelink transmissions towards the sidelink device corresponding to the gap period during gap period. Otherwise, such transmissions will likely be discarded at the receiving sidelink devices, thus resulting in reduced spectral use efficiency as described above in reference to FIG. 3A.

For embodiments shown in FIG. 3A or FIG. 3B, signaling (e.g., transmitting of the sidelink RF capability set indications 305 or 310, respectively), may be part of: a sidelink discovery message, a sidelink direct communication establishment signaling message, or a dynamically scheduled sidelink transmission, where the actual sidelink RF capability set indication is transmitted over a data PSSCH channel.

Figure 4:
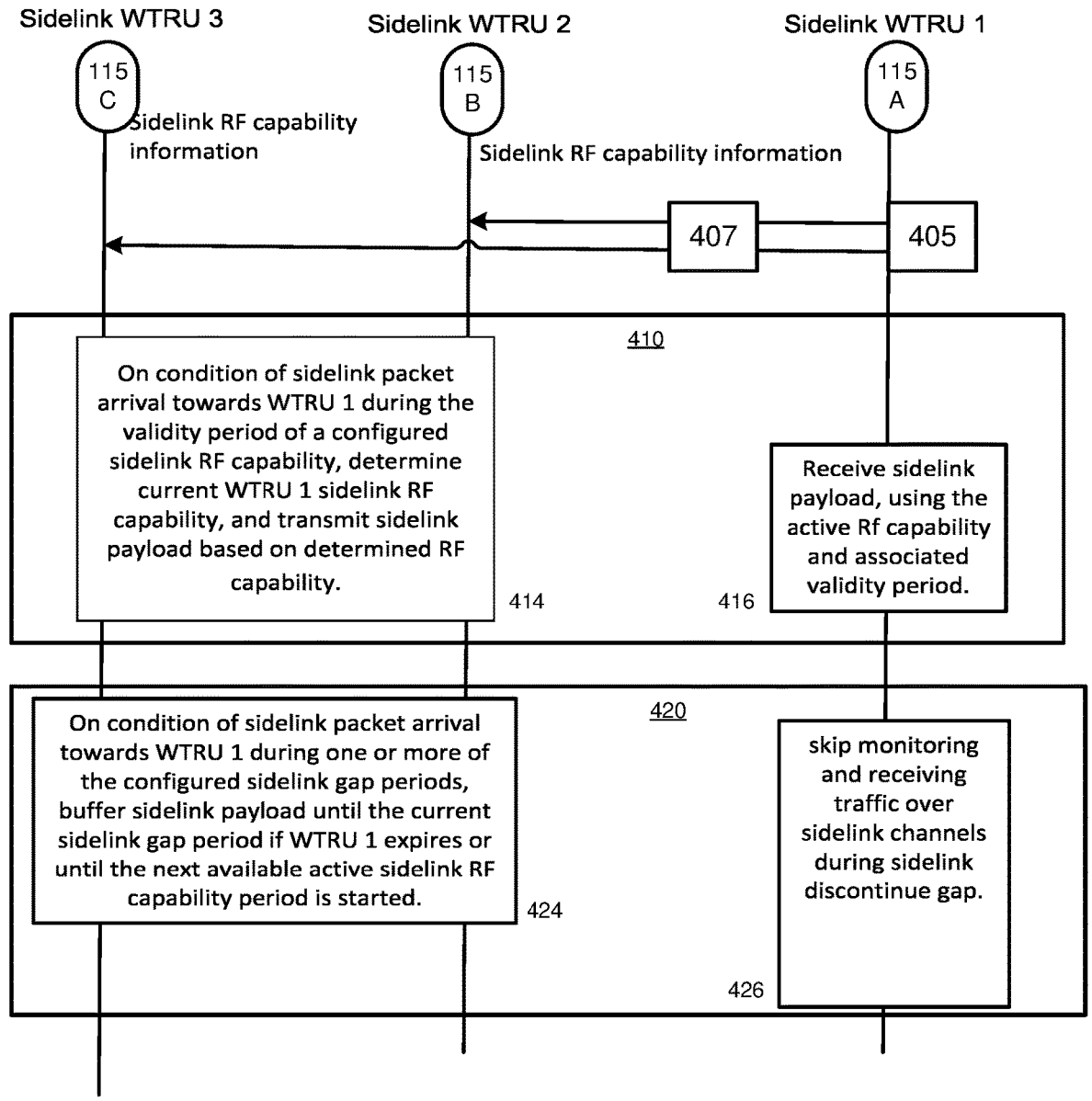
FIG. 4 illustrates a timing diagram of a resource information sharing example embodiment.

As shown in FIG. 4, a sidelink wireless transmit receive unit ("WTRU")/user equipment UE 115A determines at act 405 RF capability, such as a number of available RF chains, time availability associated with the RF chains, or other parameters as described above, that the UE can use for receiving sidelink traffic packets. Upon establishing a sidelink connection UE 115A transmits at act 407 at least one sidelink RF capability set indication to proximate (with respect to UE 115A) sidelink devices 115B and 115C, which RF capability set indication may include information regarding multiple RF capabilities (e.g., a set, or number, of RF chains available for sidelink reception), where the at least one capability set is associated with a validity time period (e.g., a timer or a periodicity) and/or a default RF capability set.

In embodiment 410, on condition of sidelink traffic/payload packet(s) arrival at UE 115C or 115B directed to UE 115A during a validity period conveyed in the sidelink RF capability set indication sent at act 407, UE 115 may determine at act 414 a sidelink RF capability of UE 115A from the sidelink RF capability set indication sent in act 407 and may transmit to UE 115A the sidelink payload packet(s) based on the determined RF capability. Alternatively, UE 115C may transmit to UE 115B the sidelink payload traffic packet and UE 115B may transmit to UE 115C the payload packet for arrival at UE 115A during the validity period and at a frequency transmitted in the information sent in the sidelink RF capability set indication at act 407. At act 416 UE 115A receives the sidelink payload packet(s) transmitted at act 414 using the active RF capability and associated validity period transmitted in the sidelink RF capability set indication at act 407. On condition of expiration of the validity period of the RF capability being used to receive the payload traffic packet(s) transmitted at act 414, UE 115A may monitor and receive payload traffic packets over sidelink channels according to a lowest possible RF capability and/or default RF capability that may have been transmitted in the sidelink RF capability set indication at act 407.

FIG. 4 also illustrates embodiment 420 where a discontinue sidelink gap period is conveyed as part of the sidelink RF capability set indication transmitted at act 407. On condition of sidelink traffic/payload packet(s) arrival at UE 115C or 115B directed to UE 115A during a configured sidelink discontinue gap period, UE 115C or UE 115B may buffer the sidelink traffic payload/packet until the sidelink discontinue gap period of UE 115A expires or until an available active sidelink RF capability validity period begins, as conveyed in the sidelink RF capability set indication transmitted at act 407. During the sidelink discontinue gap period, UE 115A may skip monitoring and receiving payload traffic packets over a sidelink channel during the configured discontinue gap period, or UE 115A may monitor and receive traffic payload packets over sidelink channels using a lowest RF capability or using a default RF capability that may have been conveyed as part of the sidelink RF capability set indication transmitted at act 407. (If UE 115B is an intermediate side link user equipment in a sidelink path from UE 115C to UE 115A, UE 15B may buffer the sidelink traffic payload/packet until the sidelink discontinue gap period of UE 115A expires or until an available active sidelink RF capability validity period begins.)

Sidelink Dynamic Data Splitting or Duplication.

Turning now to FIG. 5A, the figure illustrates a multipath sidelink group request for RF capability set information example embodiment. System 500 comprises a group of user equipment devices 115 that communicate via sidelink communication links 135. Solid lines and dashed lines represent separate sidelink links 135. System 500 comprises a first sidelink path 505 and a second sidelink path 510. First sidelink path 505 and second sidelink path 510 are illustrated in the embodiment to facilitate delivering packets of a data flow from UE 115A to UE 115G. First sidelink path 505 comprises UE115B and UE115C, and second sidelink path comprises UE 115D, UE 115E, and UE 115F. It will be appreciated that first sidelink path 505 and second sidelink path 510 may comprise destination/target UE 115G to which the packets of data flow traffic received at UE 115A is/are directed/destined. FIG. 5B illustrates a multipath sidelink group response to a request for RF capability set information example embodiment.

Sidelink data splitting may refer to a process of a transmitting sidelink device (e.g., a sidelink device that had traffic payload packets to facilitate delivery of to a destination/target sidelink user equipment) establishing a sidelink session with a destination sidelink device that can facilitate using multiple sidelink streams, or flows, to simultaneously transmit payload packets over multiple corresponding sidelink paths towards the destination UE. Splitting a sidelink data flow may improve an achievable data rate of transmitting the data flow because more than one path may be used to deliver packets of the payload traffic to the destination UE. Thus, splitting a sidelink data flow such that some packets of the sidelink data flow are transported from a transmitting UE to a destination UE on one sidelink path and other packets or the sidelink data flow are transmitted from the transmitting UE to the destination UE via a different sidelink path may facilitate delivery, via paths of a sidelink group, sidelink services that may require high performance (e.g., low latency), such as virtual reality application flows or vehicle-to-vehicle and vehicle telematics data flows that may require high bandwidth and availability.

However, due to the distributed multi-hop nature of a sidelink interface and sidelink members using the sidelink interface, conventional data split procedures fail to ensure stable capacity performance. In particular, in case sidelink channel conditions experienced by an intermediate hop device changes while involved in transmitting part of an active data splitting session, packets of the sidelink data flow being transmitted over that path may arrive at the sidelink receiver with a delay after the receiving device has received companion part of the data flow that may comprise different packets, thus reducing the effectiveness of splitting the data flow in improving the achievable data rate due to potentially having to retransmit the delayed packets that may have been delayed due to congestion experienced by the intermediate hop device.

An example embodiment comprises a transmitting sidelink device that may have established a data splitting or data duplication session (data duplication referring to transmitting the same data flow packets over two different paths to improve reliability, which tends to improve data rate since packets deleted due to congestion along one path may still be delivered without substantial delay, or substantial latency, via a different path). The transmitting sidelink device may request that sidelink devices that correspond to multiple hops that make up multiple paths to the destination device signal back (e.g., transmit back) to the transmitting device a sidelink resource availability report, as depicted in FIG. 5A. (The request for sidelink conditions is shown by unbroken lines in FIG. 5A.) A sidelink resource availably report may comprise an indication provided to the requesting sidelink device of current per-hop channel and resource conditions, such that the transmitting UE can determine a configuration of the data splitting or duplicate session (e.g., the transmitting UE may determine a best splitting of a traffic flow among multiple paths between the transmitting device and the destination device). (It will be appreciated that in some scenarios the transmitting device may be an intermediate UE itself and may determine multiple subpaths for traffic that it has received as part of a sidelink path.) Based on received per-hop sidelink resource availability reports, which receiving of reports is shown by unbroken lines in FIG. 5B, a transmitting sidelink device becomes aware of per-hop channel conditions and available channel resources, detecting possible resource congestion or resource blockage over any of the involved hops. Thus, the transmitting sidelink device (UE 115A in FIGS. 5A and 5B) may determine an optimized data split configuration including activation, deactivation, and data split/duplication ratio among determined sidelink paths (e.g., paths 505 and 510 shown in FIGS. 5A and 5B). A data split/duplication ratio may refer to transmitting UE 115A determining a ratio and volume of data of a traffic flow to be split among the selected sidelink paths based on received sidelink resource availability reports. For example, in a multi-path sidelink session, based on received sidelink resource availability reports, the first path 505 may comprise non-congested sidelink resources available towards destination UE 115G but second path 510 may have an indicated high channel busy ratio ("CBR") over one of involved hops of the second path, indicating a likely slow traffic transfer over the second path. The determination of a CBR being 'high' may be based on analyzing a CBR value received in a sidelink resource availability report of a UE of second path 510 that may exceed a determined, or a configured CBR value. The determined, or configured, CBR may vary based on a type of traffic being transmitted from UE 115A to UE 115G. Accordingly, the source sidelink device UE 115A may adjust the splitting of volume of traffic (e.g., an amount of packets) transmitted over the two sidelink paths 505 and 510 such that most of the split volume is transmitted over the sidelink path which can handle it timely (e.g., path 505, for which no sidelink resource availability reports indicated a high congestion, or a high CBR value).

As depicted by FIG. 13, in an embodiment shown in chart 1305 a resource availability report may indicate per-hop information elements, such as: a free per-hop sidelink resource sets, where for each set, it includes the timing and frequency resource information; a detected sidelink channel quality indicator ("CQI") and/or the signal to interference noise ratio ("SINR") towards the next hop node; or a CBR. In another embodiment shown in chart 1310 of FIG. 13, if a source device (e.g., a UE with traffic to transmit towards a destination UE) shares an estimated transport block size to be used in a data splitting session a resource availability report may comprise per-hop information elements, such as: an earliest possible timing instant for transferring the data split traffic size, indicated from the source device, over the next hop, which may be in terms of an indicated sidelink direct frame number ("DFN"), a sidelink symbol, or slot; or an estimated scheduling duration of the indicated data split transport block size over the next hop in terms of milliseconds, slots, or DFNs.

In an example embodiment represented by timing diagram 600 shown in FIG. 6, a sidelink user equipment 115A may initiate at act 605 a sidelink data splitting, multi-device connectivity session towards destination sidelink user equipment UE 115G. (In an embodiment, a determination to initiate a data splitting session may be based on analysis of a traffic flow to be delivered to sidelink UE device 115G.) The user equipment that initiates the data splitting session, UE 115A in FIG. 6, may determine at act 610 multiple sidelink routes, or paths, including sidelink nodes UE 115C and UE 115E and associated relay device identifiers, to carry the split data traffic towards the destination UE 115G. UE 115A may use a sidelink routing protocol to establish the traffic paths. (It will be appreciated that the UE item numbers 115A, 115C, 115E, and 115G, may correspond to similarly referenced items shown in FIGS. 5A and 5B.) UE 115A may generate at act 615 a sidelink resource availability request and an indication of the average sidelink transport block size of a soon-to-begin sidelink data split session with other user equipment in a sidelink group of which UE 115A and UE 115G may be members. UE 115A may transmit to other sidelink device in the group an identifier of the destination user equipment UE 115G. A resource availability request may be transmitted at act 620 to a destination identifier (the term 'destination' not used here to necessarily refer to destination UE 115G, but is used to refer to a destination address, or other identifier, corresponding to one or more UEs other than UE 115A) that may comprise: a preconfigured sidelink multi-connectivity group identifier, a broadcast identifier and/or multicast identifier, or a sidelink unicast identifier corresponding to identifiers corresponding to determined intermediate nodes (e.g., sidelink user equipment) that make up determined paths (determined by the user equipment that initiates the traffic splitting session) for transporting the traffic flow to be split. As nodes to be involved as nodes in a sidelink path of the data split session based on the determination made at act 610, sidelink UE 115C and UE 115F may compile/generate at act 625 sidelink resource availability reports. The sidelink availability reports may comprise: one or more sets of available free sidelink resources (such as, for example, timing and frequency resource information), an average sidelink CQI, a SINR corresponding to a next-hop node, or a calculated/determined CBR. The sidelink availability reports may comprise: a scheduling earliest possible starting time index (e.g., a starting slot, a symbol, or a DFN), or an estimated scheduling length of the signaled transport block size. Sidelink UE 115C and UE 115E may transmit the compiled sidelink resource availability reports at act 630.

UE 115A may determine at act 635 a sidelink data split ratio among the determined routes/paths (e.g., a ratio of transmitted sidelink transport block and/or code blocks on each route/path within the active session), based on sidelink resource availability reports transmitted at act 630. UE 115A may transmit at act 640 sidelink payload packets corresponding to the traffic flow to be split towards the destination device where the aggregate transport or block code size may be simultaneously divided between, and transmitted via, the determined sidelink routes according to the determined split ratio. It will be appreciated that, for example, in a determined two-path session, a ratio of 1 may refer to a duplicate transmission session where packets of a give traffic flow are transmitted on both paths simultaneously. In other words, a ratio of 1 implies that instead of splitting some packets of a given flow for transport over one path and other packets of the traffic flow to be transported over another path, the same packets of a given flow are duplicated and the duplicates are transported via two, or more, different sidelink paths. In an embodiment, UE 115A may determine a traffic splitting ratio according to a defined importance criterion. A given traffic flow may comprise some packets that are more important that other packets (e.g., a packet carrying audio traffic may be more important than a packet carrying a corresponding video frame, or a packet carrying vehicle operation information calculated by a roadside component, such as component show in in FIG. 2B to be used by an autonomous vehicle in operating the vehicle may be more important than a packet carrying an audio message that corresponds to the calculated vehicle operation information). An importance threshold value may be configured, and important packets of a portion of a data traffic flow that have an importance higher than the configured importance threshold may be duplicated over multiple sidelink paths but packets having an importance less than the importance threshold may only be transmitted over one sidelink path.

Adaptive Reporting of a Data Split/Duplication Resource Availability Report.

The sidelink resource availability report as described above, when available at the sidelink transmitting device may facilitate implementing a data flow splitting or data duplication session. Sidelink availability reports may be requested and received by a source sidelink device at the time of establishing a sidelink data splitting session, and data splitting or duplication session configurations may be tuned accordingly. However, due to the distributed and mobile nature of sidelink devices, and device discovery, the per-hop sidelink channel conditions can drastically change during a short period. Accordingly, an established (e.g., current) data splitting traffic delivery plan may be no longer be suitable for per-hop sidelink channel conditions that have changed since the establishment of a current session.

A source/transmitting sidelink user equipment device may request that intermediate sidelink nodes involved with a sidelink data delivery plan session periodically, or non-periodically, share respective corresponding sidelink resource availability reports, which may be referred to as updated sidelink resource availability reports. Accordingly, transmitting sidelink user equipment devices, such as UE 115A shown in in FIG. 5A and FIG. 5B, may obtain updated information that reflects per-hop channel conditions. A request for per-hop channel conditions, or updated per-hop conditions, may comprise information elements, such as: a reporting format indication including periodic or event-trigged reporting, respectively; if a periodic reporting indication is present, an associated periodicity of transmitting the sidelink per-hop channel resource availability information; if event-triggered indication reporting is requested, an associated event condition, or criterion, which when fulfilled, or met, may trigger reporting of a per-hop sidelink resource availability report. Examples of event conditions/criteria associated with a sidelink member of a sidelink path may comprise: a preconfigured change percentage of a current CBR value compared to a most recently reported previous reported CBR value; a reconfigured change percentage of a SINR value towards the next hop compared to a most recently reported previous reported SINR value; a reconfigured change percentage of a CQI value towards the next hop compared to a most recently reported previous reported CQI value; a preconfigured change percentage of a current available amount of per-hop sidelink resources (in terms of available sidelink physical resource blocks, sub-channels, or resource pools) compared to a most recently reported previous reported available amount of per-hop sidelink resource value. Reporting configurations, and corresponding indication messages, can facilitate connection establishment between the source sidelink device (that is, establishing a data split session) and intermediate devices for transmitting a data flow towards a destination/target device.

Figure 7:
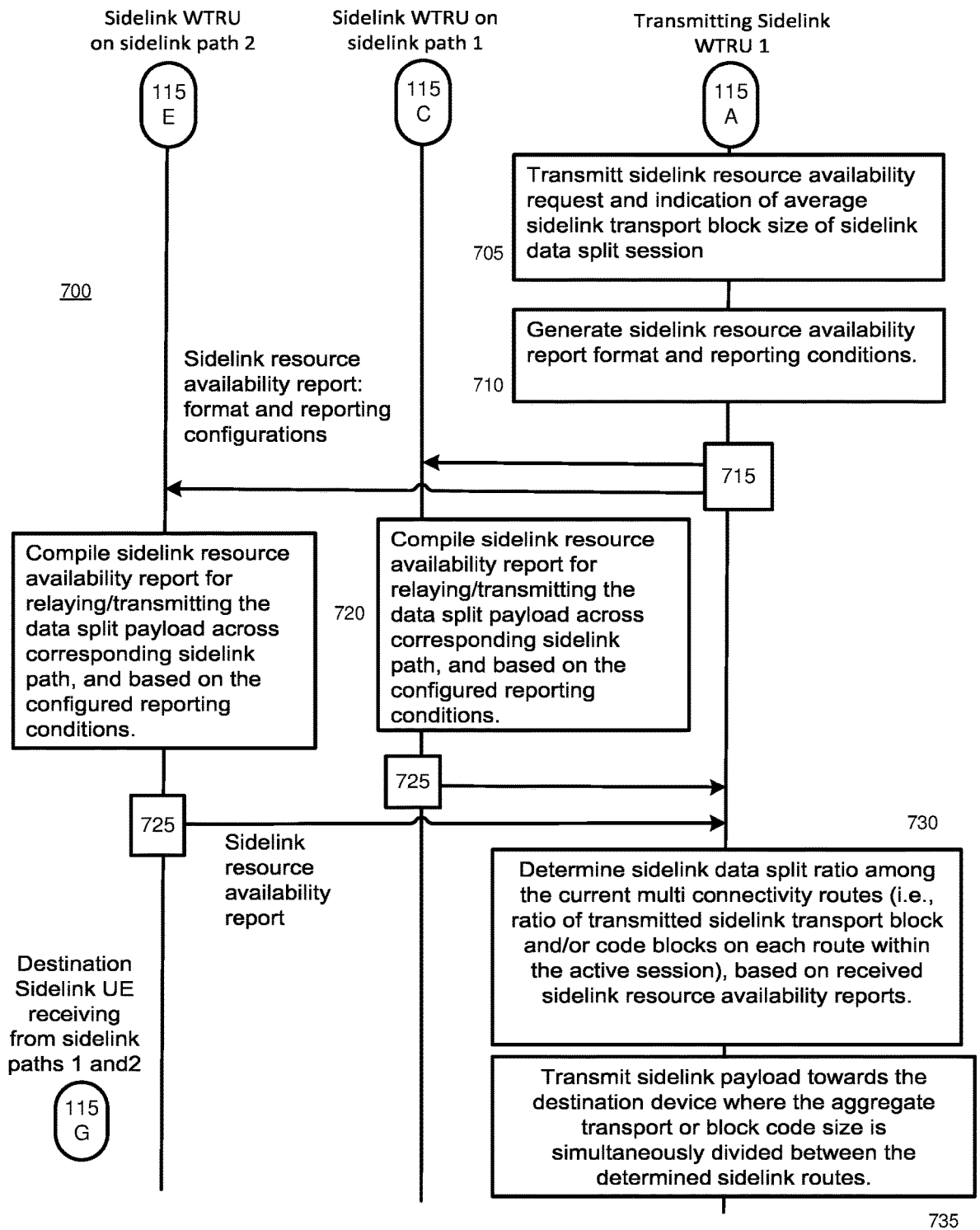
FIG. 7 illustrates a timing diagram of an example method to dynamically adapt traffic flows via multiple sidelink paths based on a congestion condition.

In an embodiment shown represented by timing diagram 700 shown in FIG. 7, a sidelink user equipment 115A, involved in an active multi connectivity/data split/packet duplication sidelink session, may transmit at act 705 sidelink a request for sidelink resource availability and an indication of an average sidelink transport block size of a sidelink data splitting session. At act 710, UE 115A may generate configurations of resource availability reports to be used by other user equipment involved in the active multi connectivity/data split/packet duplication sidelink session and may transmit the configurations and reporting conditions to be used for generating sidelink resource availability reports or updated sidelink resource availability reports at act 715. The configurations, or configuration information, transmitted at act 715 may comprise format or reporting conditions to be used to generate resource availability reports or updated resource availability reports. In an embodiment, configurations may comprise an indication that the reporting format of the resource availability report should be periodically transmitted, and the configurations may comprise a periodicity associated with the periodic reporting transmission. In another embodiment, configurations may comprise an indication that a reporting of resource availability information be event-based transmissions; or the configurations may comprise corresponding reporting conditions to be met before an updated resource availability report is generated and transmitted. The conditions to be satisfied, or met, before the generating or transmitting of an updated resources availability may comprise: a preconfigured change percentage threshold of the detected channel busy ratio, a preconfigured change percentage threshold of available channel resources, a preconfigured change percentage threshold of received channel quality and/or coverage towards a next hop of a multi-connectivity sidelink path. At act 720 sidelink user equipment, such as UE115C and UE 115E, that make up sidelink paths used to transmit a traffic flow according to a splitting or duplicate transmission plan, or traffic delivery plan, may generate/compile, at act 720, sidelink resource availability reports, or updated sidelink resource availability reports. UE115C or UE 115E may transmit at act 725 sidelink resource availability reports, or updated sidelink resource availability reports. At act 730 UE 115A receives updated channel resource availability reports, determines an updated data split ratio, and updates and/or overwrites former configurations of the sidelink data split ratio applied to the current multi connectivity routes/paths in an updated traffic delivery plan (e.g., ratio of transmitted sidelink transport block and/or code blocks on each sidelink route/path within the active session). At act 735, UE 115A transmits traffic to destination/target user equipment UE115G according to an updated traffic delivery plan that is determined based on updated sidelink resource availability reports transmitted at act 725.

Figure 8:
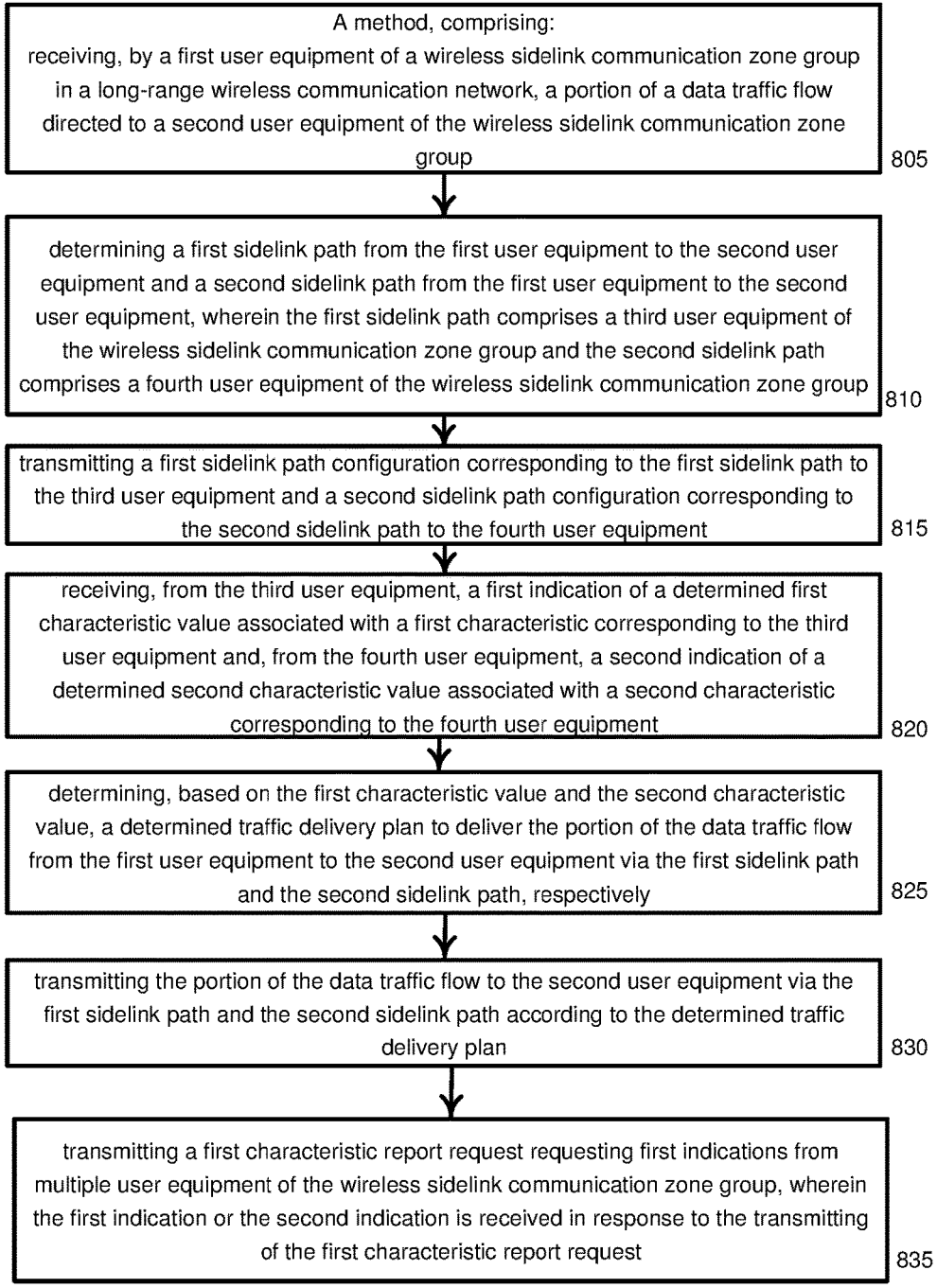
FIG. 8 illustrates a block diagram of an example method.
Figure 9:
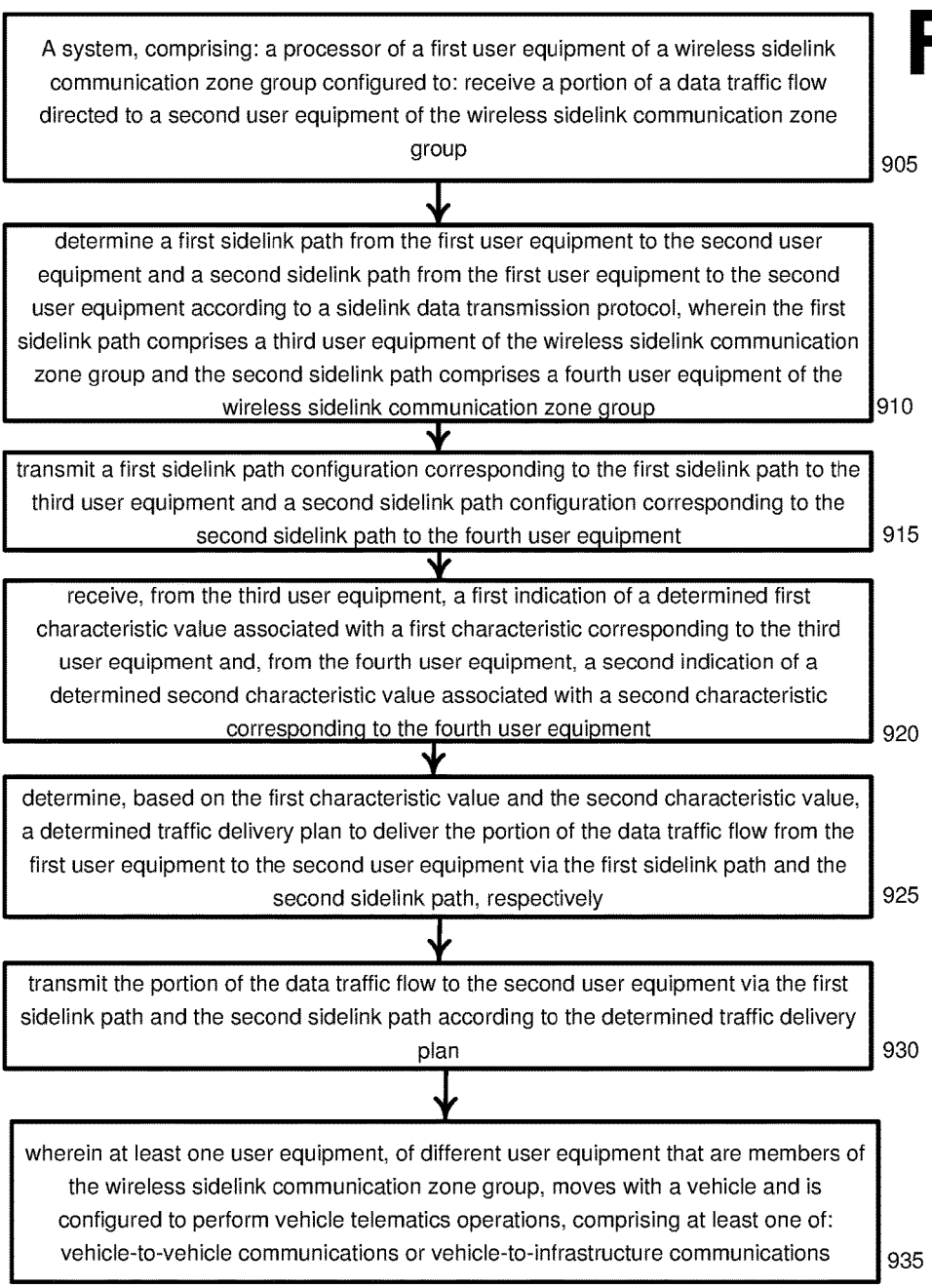
FIG. 9 illustrates a block diagram of an example user equipment system.

Turning now to FIG. 8, the figure illustrates an example embodiment method 800 comprising at block 805 receiving, by a first user equipment of a wireless sidelink communication zone group in a long-range wireless communication network, a portion of a data traffic flow directed to a second user equipment of the wireless sidelink communication zone group; at block 810 determining a first sidelink path from the first user equipment to the second user equipment and a second sidelink path from the first user equipment to the second user equipment, wherein the first sidelink path comprises a third user equipment of the wireless sidelink communication zone group and the second sidelink path comprises a fourth user equipment of the wireless sidelink communication zone group; at block 815 transmitting a first sidelink path configuration corresponding to the first sidelink path to the third user equipment and a second sidelink path configuration corresponding to the second sidelink path to the fourth user equipment; at block 820 receiving, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment; at block 825 determining, based on the first characteristic value and the second characteristic value, a determined traffic delivery plan to deliver the portion of the data traffic flow from the first user equipment to the second user equipment via the first sidelink path and the second sidelink path, respectively; at block 830 transmitting the portion of the data traffic flow to the second user equipment via the first sidelink path and the second sidelink path according to the determined traffic delivery plan; and at block 835 transmitting a first characteristic report request requesting first indications from multiple user equipment of the wireless sidelink communication zone group, wherein the first indication or the second indication is received in response to the transmitting of the first characteristic report request Turning now to FIG. 9, the figure illustrates an example system embodiment 900 comprising at step 905 a processor of a first user equipment of a wireless sidelink communication zone group configured to: receive a portion of a data traffic flow directed to a second user equipment of the wireless sidelink communication zone group; at block 910 determine a first sidelink path from the first user equipment to the second user equipment and a second sidelink path from the first user equipment to the second user equipment according to a sidelink data transmission protocol, wherein the first sidelink path comprises a third user equipment of the wireless sidelink communication zone group and the second sidelink path comprises a fourth user equipment of the wireless sidelink communication zone group; at block 915 transmit a first sidelink path configuration corresponding to the first sidelink path to the third user equipment and a second sidelink path configuration corresponding to the second sidelink path to the fourth user equipment; at block 920 receive, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment; at block 925 determine, based on the first characteristic value and the second characteristic value, a determined traffic delivery plan to deliver the portion of the data traffic flow from the first user equipment to the second user equipment via the first sidelink path and the second sidelink path, respectively; at block 930 transmit the portion of the data traffic flow to the second user equipment via the first sidelink path and the second sidelink path according to the determined traffic delivery plan; and at block 935 wherein at least one user equipment, of different user equipment that are members of the wireless sidelink communication zone group, moves with a vehicle and is configured to perform vehicle telematics operations, comprising at least one of: vehicle-to-vehicle communications or vehicle-to-infrastructure communications.

Figure 10:
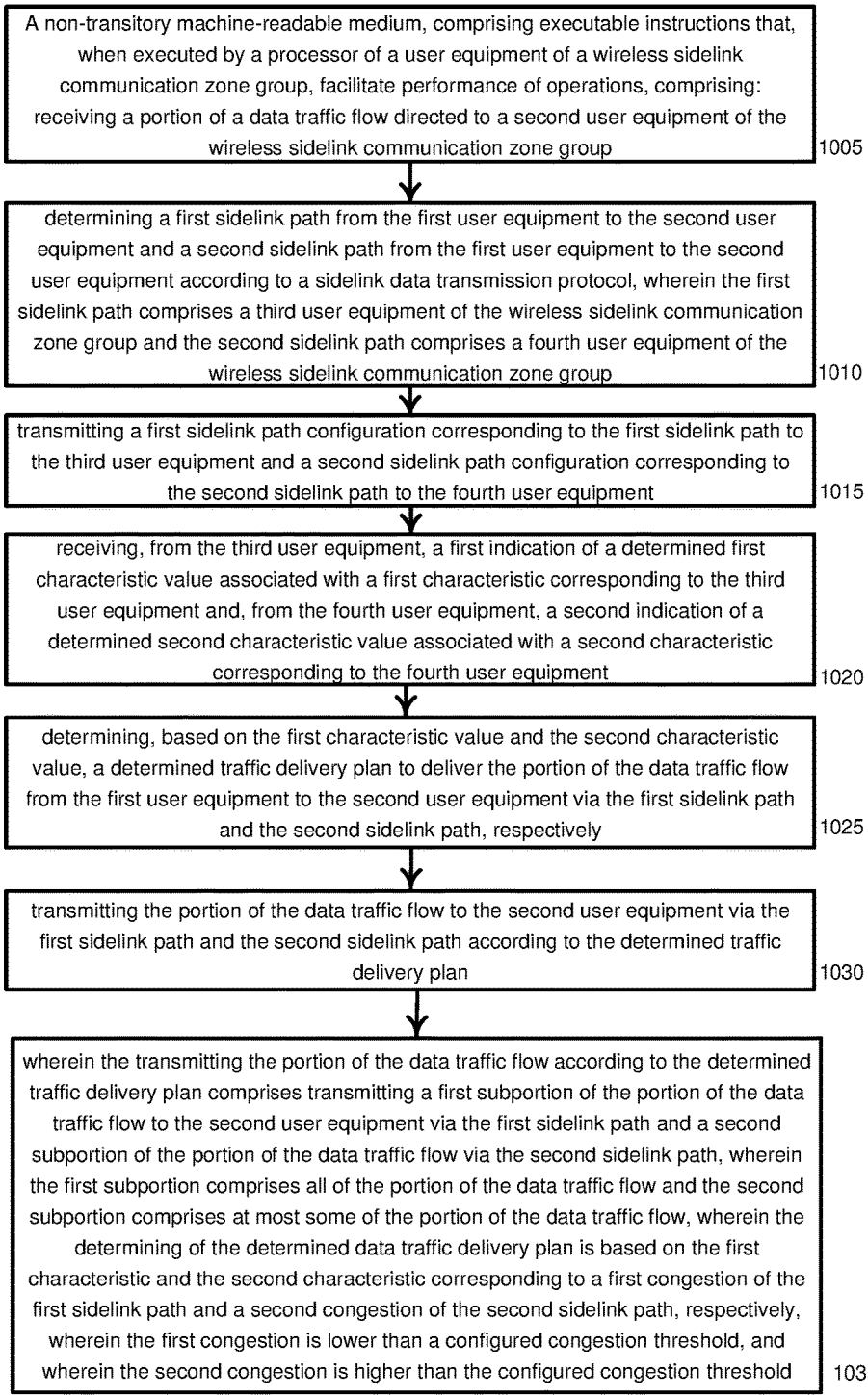
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by a processor of a user equipment of a wireless sidelink communication zone group, facilitate performance of operations, comprising: receiving a portion of a data traffic flow directed to a second user equipment of the wireless sidelink communication zone group; a block 1010 determining a first sidelink path from the first user equipment to the second user equipment and a second sidelink path from the first user equipment to the second user equipment according to a sidelink data transmission protocol, wherein the first sidelink path comprises a third user equipment of the wireless sidelink communication zone group and the second sidelink path comprises a fourth user equipment of the wireless sidelink communication zone group; at block 1015 transmitting a first sidelink path configuration corresponding to the first sidelink path to the third user equipment and a second sidelink path configuration corresponding to the second sidelink path to the fourth user equipment; at block 1020 receiving, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment; at block 1025 determining, based on the first characteristic value and the second characteristic value, a determined traffic delivery plan to deliver the portion of the data traffic flow from the first user equipment to the second user equipment via the first sidelink path and the second sidelink path, respectively; at block 1030 transmitting the portion of the data traffic flow to the second user equipment via the first sidelink path and the second sidelink path according to the determined traffic delivery plan; and at block 1035 wherein the transmitting the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein the first subportion comprises all of the portion of the data traffic flow and the second subportion comprises at most some of the portion of the data traffic flow, wherein the determining of the determined data traffic delivery plan is based on the first characteristic and the second characteristic corresponding to a first congestion of the first sidelink path and a second congestion of the second sidelink path, respectively, wherein the first congestion is lower than a configured congestion threshold, and wherein the second congestion is higher than the configured congestion threshold.

Figure 11:
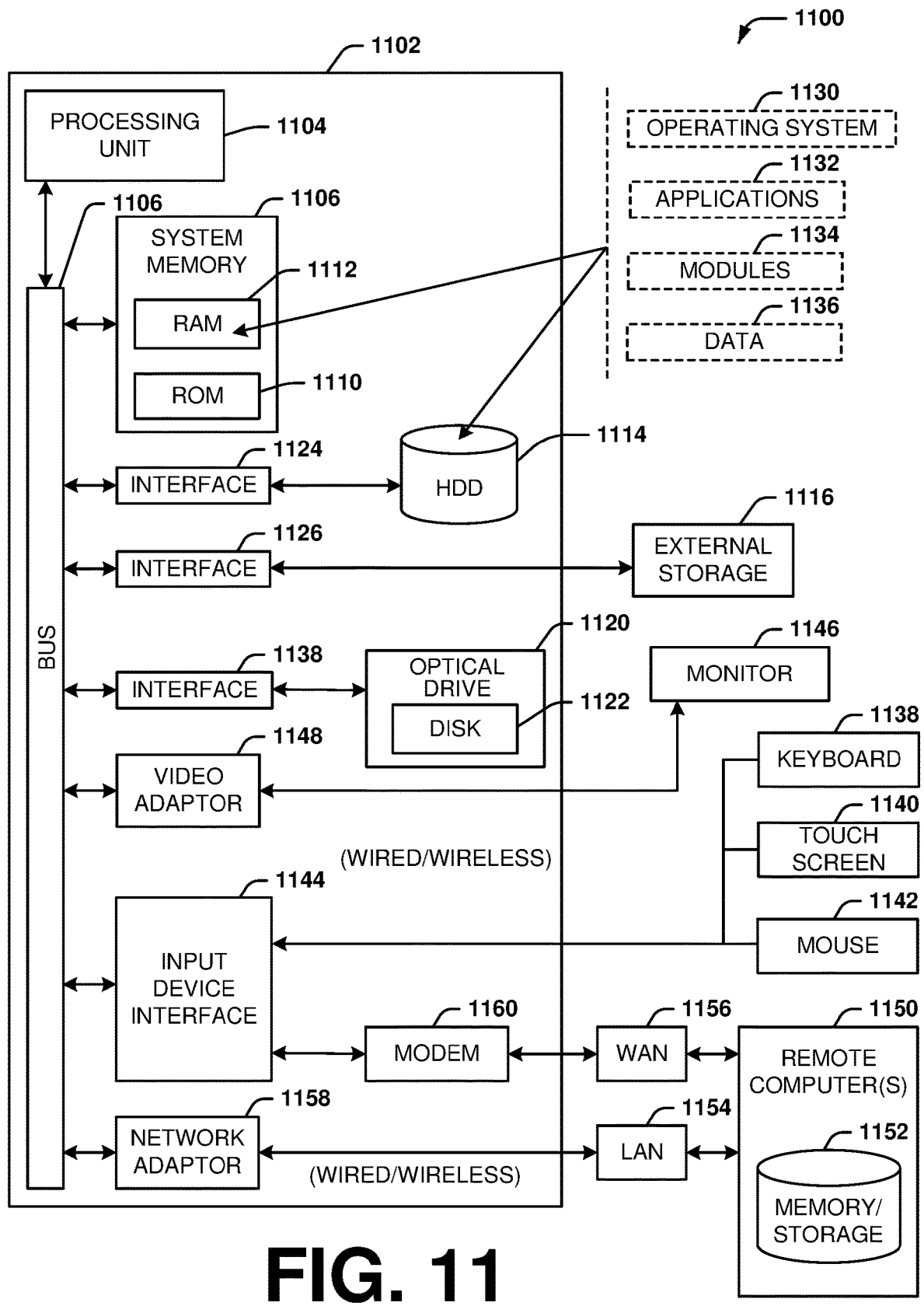
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
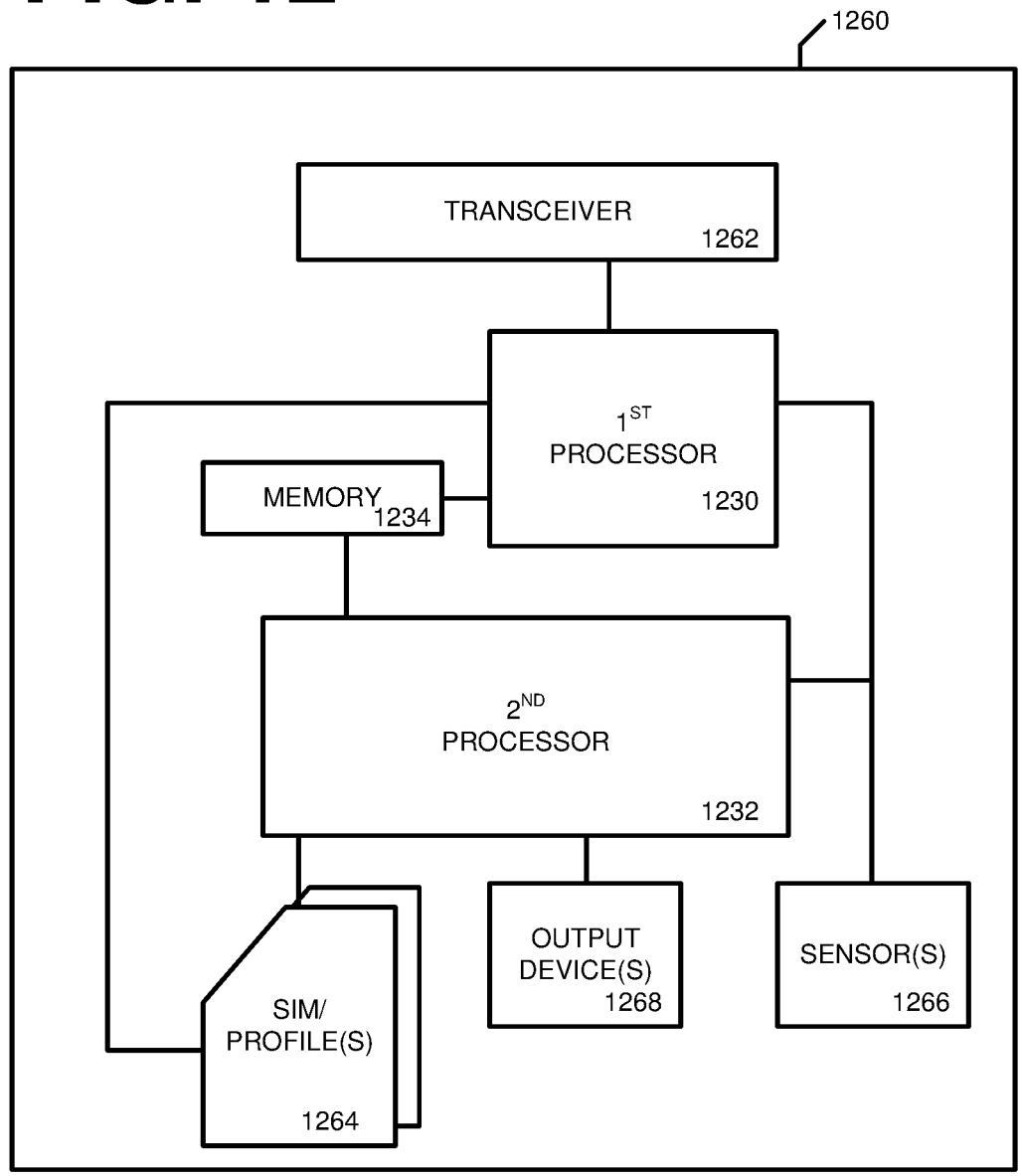
FIG. 12 illustrates a block diagram of an example wireless UE.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 30 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a first user equipment of a wireless sidelink communication zone group in a long-range wireless communication network, a portion of a data traffic flow directed to a second user equipment of the wireless sidelink communication zone group;

determining a first sidelink path from the first user equipment to the second user equipment and a second sidelink path from the first user equipment to the second user equipment, wherein the first sidelink path comprises a third user equipment of the wireless sidelink communication zone group and the second sidelink path comprises a fourth user equipment of the wireless sidelink communication zone group;

transmitting a first sidelink path configuration corresponding to the first sidelink path to the third user equipment and a second sidelink path configuration corresponding to the second sidelink path to the fourth user equipment;

receiving, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment;

determining, based on the first characteristic value and the second characteristic value, a determined traffic delivery plan to deliver the portion of the data traffic flow from the first user equipment to the second user equipment via the first sidelink path and the second sidelink path, respectively; and transmitting the portion of the data traffic flow to the second user equipment via the first sidelink path and the second sidelink path according to the determined traffic delivery plan.

2. The method of claim 1, wherein the first characteristic value or the second characteristic value comprises information, respectively corresponding to the third user equipment or the fourth user equipment, related to at least one of: a first number of active transmitting radio frequency (RF) chains, respectively, of the third user equipment or fourth user equipment, a second number of active receiving RF chains, respectively, of the third user equipment or fourth user equipment, a validity period of time, an index of a default RF capability set, or a sidelink resource unavailable period.

3. The method of claim 1, wherein the first characteristic value or the second characteristic value comprises information, respectively corresponding to the third user equipment or the fourth user equipment, related to at least one of: an available resource timing pattern and spectrum allocation, a sidelink channel quality indicator parameter, a signal to interference noise ratio associated with communication to a next user equipment in the first sidelink path or the second sidelink path after the third user equipment or the fourth use equipment, respectively, a channel busy ratio parameter, an earliest possible timing instant, a sidelink direct frame number, a sidelink symbol, or a sidelink slot.

4. The method of claim 1, further comprising transmitting a first characteristic report request requesting first indications from multiple user equipment of the wireless sidelink communication zone group, wherein the first indication or the second indication is received in response to the transmitting of the first characteristic report request.

5. The method of claim 4, further comprising:

transmitting a second characteristic report request requesting second indications from the multiple user equipment of the wireless sidelink communication zone group, wherein a third indication or a fourth indication is received in response to the transmitting of the second characteristic report request, and wherein at least one of the third indication or the fourth indication indicates a change of the first characteristic value or the second characteristic value to an updated first characteristic value or an updated second characteristic value, respectively;

determining, based on the updated first characteristic value or the updated second characteristic value, a determined updated traffic delivery plan to deliver the portion of the data traffic flow from the first user equipment to the second user equipment via the first sidelink path and the second sidelink path, respectively; and transmitting the portion of the data traffic flow to the second user equipment via the first sidelink path and the second sidelink path according to the determined updated traffic delivery plan, wherein the determined traffic delivery plan comprises first instructions to transmit a first subportion of the data traffic flow to the second user equipment via the first sidelink path and a second subportion of the data traffic flow to the second user equipment via the second sidelink path, wherein the determined updated traffic delivery plan comprises second instructions to transmit a third subportion of the data traffic flow to the second user equipment via the first sidelink path and a fourth subportion of the data traffic flow to the second user equipment via the second sidelink path, and wherein a first subportion ratio of the first subportion to the second subportion is different than a second subportion ratio of the third subportion to the fourth subportion.

6. The method of claim 1, wherein the transmitting of the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein one of the first subportion or the second subportion comprises a duplicate of the second subportion or the first subportion, respectively, wherein the determining of the determined data traffic delivery plan is based on the first characteristic and the second characteristic corresponding to a first congestion of the first sidelink path and a second congestion of the second sidelink path, respectively, and wherein the first congestion and the second congestion are lower than a configured congestion threshold.

7. The method of claim 1, wherein the transmitting of the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein the first subportion comprises all of the portion of the data traffic flow and the second subportion comprises less than all of the portion of the data traffic flow, wherein the determining of the determined data traffic delivery plan is based on the first characteristic and the second characteristic corresponding to a first congestion of the first sidelink path and a second congestion of the second sidelink path, respectively, wherein the first congestion is lower than a configured congestion threshold, and wherein the second congestion is higher than the configured congestion threshold.

8. The method of claim 7, further comprising determining, according to a defined importance criterion, important packets of the portion of the data traffic flow that have an importance higher than a configured importance threshold, and wherein the second subportion of the portion of the data traffic flow comprises only the important packets.

9. A system, comprising:
a processor of a first user equipment of a wireless sidelink communication zone group configured to:
receive a portion of a data traffic flow directed to a second user equipment of the wireless sidelink communication zone group;
determine a first sidelink path from the first user equipment to the second user equipment and a second sidelink path from the first user equipment to the second user equipment according to a sidelink data transmission protocol, wherein the first sidelink path comprises a third user equipment of the wireless sidelink communication zone group and the second sidelink path comprises a fourth user equipment of the wireless sidelink communication zone group;
transmit a first sidelink path configuration corresponding to the first sidelink path to the third user equipment and a second sidelink path configuration corresponding to the second sidelink path to the fourth user equipment;
receive, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment;
determine, based on the first characteristic value and the second characteristic value, a determined traffic delivery plan to deliver the portion of the data traffic flow from the first user equipment to the second user equipment via the first sidelink path and the second sidelink path, respectively; and
transmit the portion of the data traffic flow to the second user equipment via the first sidelink path and the second sidelink path according to the determined traffic delivery plan.

10. The system of claim 9, wherein the processor is further configured to:
transmit a first characteristic report request requesting first indications from user equipment that are part of the wireless sidelink communication zone group, wherein the first indication or the second indication is received in response to the transmitting of the first characteristic report request;
transmit a second characteristic report request requesting second indications from the user equipment that are part of the wireless sidelink communication zone group, wherein a third indication or a fourth indication is received in response to the transmitting of the second characteristic report request, wherein at least one of the third indication or the fourth indication indicates a change of the first characteristic value or the second characteristic value to an updated first characteristic value or an updated second characteristic value, respectively;
determining, based on the updated first characteristic value or the updated second characteristic value, a determined updated traffic delivery plan to deliver the portion of the data traffic flow from the first user equipment to the second user equipment via the first sidelink path and the second sidelink path, respectively; and
transmit the portion of the data traffic flow to the second user equipment via the first sidelink path and the second sidelink path according to the determined updated traffic delivery plan,
wherein the determined traffic delivery plan comprises first instructions to transmit a first subportion of the data traffic flow to the second user equipment via the first sidelink path and a second subportion of the data traffic flow to the second user equipment via the second sidelink path, wherein the determined updated traffic delivery plan comprises instructions to transmit a third subportion of the data traffic flow to the second user equipment via the first sidelink path and a fourth subportion of the data traffic flow to the second user equipment via the second sidelink path, and wherein a first subportion ratio of the first subportion to the second subportion is different than a second subportion ratio of the third subportion to the fourth subportion.

11. The system of claim 9, wherein the transmitting of the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein one of the first subportion or the second subportion comprises a duplicate of the second subportion or the first subportion, respectively, wherein the determining of the determined data traffic delivery plan is based on the first characteristic and the second characteristic corresponding to a first congestion of the first sidelink path and a second congestion of the second sidelink path, respectively, and wherein the first congestion and the second congestion are lower than a configured congestion threshold.

12. The system of claim 9, wherein the transmitting of the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein the first subportion comprises all of the portion of the data traffic flow and the second subportion comprises less than all of the portion of the data traffic flow, wherein the determining of the determined data traffic delivery plan is based on the first characteristic and the second characteristic corresponding to a first congestion of the first sidelink path and a second congestion of the second sidelink path, respectively, wherein the first congestion is lower than a configured congestion threshold, and wherein the second congestion is higher than the configured congestion threshold.

13. The system of claim 12, wherein the processor is further configured to determine, according to a defined importance metric, important packets of the portion of the data traffic flow that have an importance higher than a configured importance threshold, and wherein the second subportion of the portion of the data traffic flow comprises only the important packets.

14. The system of claim 9, wherein at least one user equipment, of different user equipment that are members of the wireless sidelink communication zone group, moves with a vehicle and is configured to perform vehicle telematics operations, comprising at least one of: vehicle-to-vehicle communications or vehicle-to-infrastructure communications.

15. The system of claim 9, wherein at least one of the user equipment members of the wireless sidelink communication zone group is stationary along a roadway and is configured to perform vehicle-to-infrastructure communications.

16. A non-transitory machine-readable medium, comprising executable instructions that, when executed by a processor of a user equipment of a wireless sidelink communication zone group, facilitate performance of operations, comprising:

receiving a portion of a data traffic flow directed to a second user equipment of the wireless sidelink communication zone group;

determining a first sidelink path from the first user equipment to the second user equipment and a second sidelink path from the first user equipment to the second user equipment according to a sidelink data transmission protocol, wherein the first sidelink path comprises a third user equipment of the wireless sidelink communication zone group and the second sidelink path comprises a fourth user equipment of the wireless sidelink communication zone group;

transmitting a first sidelink path configuration corresponding to the first sidelink path to the third user equipment and a second sidelink path configuration corresponding to the second sidelink path to the fourth user equipment;

receiving, from the third user equipment, a first indication of a determined first characteristic value associated with a first characteristic corresponding to the third user equipment and, from the fourth user equipment, a second indication of a determined second characteristic value associated with a second characteristic corresponding to the fourth user equipment;

determining, based on the first characteristic value and the second characteristic value, a determined traffic delivery plan to deliver the portion of the data traffic flow from the first user equipment to the second user equipment via the first sidelink path and the second sidelink path, respectively; and transmitting the portion of the data traffic flow to the second user equipment via the first sidelink path and the second sidelink path according to the determined traffic delivery plan.

17. The non-transitory machine-readable medium of claim 16, wherein the operations further comprise:

transmitting a first characteristic report request requesting indications from user equipment of the wireless sidelink communication zone group, wherein the first indication or the second indication are received in response to the transmitting of the first characteristic report request;

transmitting a second characteristic report request requesting indications from user equipment of the wireless sidelink communication zone group, wherein a third indication or a fourth indication are received in response to the transmitting of the second characteristic report request, wherein at least one of the third indication or the fourth indication indicates a change of the first characteristic value or the second characteristic value to an updated first characteristic value or an updated second characteristic value, respectively;

determining, based on the updated first characteristic value or the updated second characteristic value, a determined updated traffic delivery plan to deliver the portion of the data traffic flow from the first user equipment to the second user equipment via the first sidelink path and the second sidelink path, respectively; and transmitting the portion of the data traffic flow to the second user equipment via the first sidelink path and the second sidelink path according to the determined updated traffic delivery plan, wherein the determined traffic delivery plan comprises first instructions to transmit a first subportion of the data traffic flow to the second user equipment via the first sidelink path and a second subportion of the data traffic flow to the second user equipment via the second sidelink path, wherein the determined updated traffic delivery plan comprises second instructions to transmit a third subportion of the data traffic flow to the second user equipment via the first sidelink path and a fourth subportion of the data traffic flow to the second user equipment via the second sidelink path, and wherein a first subportion ratio of the first subportion to the second subportion is different than a second subportion ratio of the third subportion to the fourth subportion.

18. The non-transitory machine-readable medium of claim 16, wherein the transmitting of the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein one of the first subportion or the second subportion comprises a duplicate of the other subportion, wherein the determining of the determined data traffic delivery plan is based on the first characteristic and the second characteristic corresponding to a first congestion of the first sidelink path and a second congestion of the second sidelink path, respectively, and wherein the first congestion and the second congestion are lower than a configured congestion threshold.

19. The non-transitory machine-readable medium of claim 16, wherein the transmitting the portion of the data traffic flow according to the determined traffic delivery plan comprises transmitting a first subportion of the portion of the data traffic flow to the second user equipment via the first sidelink path and a second subportion of the portion of the data traffic flow via the second sidelink path, wherein the first subportion comprises all of the portion of the data traffic flow and the second subportion comprises at most some of the portion of the data traffic flow, wherein the determining of the determined data traffic delivery plan is based on the first characteristic and the second characteristic corresponding to a first congestion of the first sidelink path and a second congestion of the second sidelink path, respectively, wherein the first congestion is lower than a configured congestion threshold, and wherein the second congestion is higher than the configured congestion threshold.

20. The non-transitory machine-readable medium of claim 19, wherein the operations further comprise determining packets of the portion of the data traffic flow that have a high priority defined as being higher than a configured priority threshold, and wherein the second subportion of the portion of the data traffic flow comprises only the packets that have the high priority.

* * * * *